US007130422B2

(12) United States Patent
Futa et al.

(10) Patent No.: US 7,130,422 B2
(45) Date of Patent: Oct. 31, 2006

(54) INFORMATION SECURITY DEVICE, PRIME NUMBER GENERATION DEVICE, AND PRIME NUMBER GENERATION METHOD

(75) Inventors: Yuichi Futa, Osaka (JP); Takatoshi Ono, Ama-gun (JP); Motoji Ohmori, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 842 days.

(21) Appl. No.: 10/120,489

(22) Filed: Apr. 12, 2002

(65) Prior Publication Data

US 2002/0176573 A1 Nov. 28, 2002

(30) Foreign Application Priority Data

Apr. 17, 2001 (JP) ............................. 2001-117842

(51) Int. Cl.
*H04L 9/30* (2006.01)
*G06F 4/58* (2006.01)
*G06F 7/38* (2006.01)

(52) U.S. Cl. ..................... 380/28; 780/250; 780/490
(58) Field of Classification Search ................ 380/28; 708/250, 490
See application file for complete search history.

(56) References Cited

U.S. PATENT DOCUMENTS

| 6,330,332 B1* | 12/2001 | Itoh et al. ................. 380/28 |
| 2002/0186837 A1* | 12/2002 | Hopkins et al. .......... 380/28 |
| 2004/0057580 A1* | 3/2004 | Tie et al. ................... 380/46 |

OTHER PUBLICATIONS

Adelman et al., "Recognizing Primes in Random Polynomial Time", 1987, ACM, pp. 462-469.*

Ueli M. Maurer, entitled "*Fast Generation of Secure RSA-Moduli With Almost Maximal Diversity*", Institute for Signal and Information Processing Swiss Federal Institute for Technology CH-8092 Zürich, Switzerland, pp. 637-647.

Patent Abstracts of Japan, entitled "*Ciphering Device, Cryptographic Key Generation Method and Method of Managing Cryptographic Key, and Prime Number Generation Device and Method Therefor*", vol. 1998, No.14, Dec. 31, 1998 & JP 10-240128 (Toshiba Corp), Sep. 11, 1998.

Menezes A. J., et al. "*Handbook of Applied Cryptography*", Handbook of Applied Cryptography, CRC Press Series on Discrete Mathematices and its Applications, Boca Raton, FL, CRC Press, US, 1997, pp. 133-154.

Mihailescu P., ED—Desmedt Y G, International Association for Cryptologic Research: "*Fast Generation of Provable Primes Using Search in Arithmetic Progressions*", Advances in Cryptology (CRYPTO). Santa Barbara, Aug. 21-25, 1994, Proceedings of the Annual International Cryptology Conference (CRYPTO), Berlin, Springer, DE, vol. Conf. 14, Aug. 21, 1994, pp. 282-293, XP008032135.

* cited by examiner

*Primary Examiner*—Matthew Smithers
(74) *Attorney, Agent, or Firm*—Wenderoth, Lind & Ponack, L.L.P.

(57) ABSTRACT

An information security device receives an input of prime q, and generates prime N that is larger than prime q. In the information security device, a partial information setting unit generates number u such that $2 \times u \times q + 1 \neq 0 \mod L_i$ ($i=1, 2, \ldots, n$). A random number generating unit generates random number R'. A judgement target generating unit generates $R = u + L_1 \times L_2 \times \ldots \times L_n \times R'$ and $N = 2 \times R \times q + 1$, using number u and random number R'. A primality judging unit judges the primality of number N, using numbers N and R generated by the judgement target generating unit.

13 Claims, 10 Drawing Sheets

INFORMATION SECURITY DEVICE, PRIME NUMBER GENERATION DEVICE, AND PRIME NUMBER GENERATION METHOD

This application is based on an application No. 2001-117842 filed in Japan, the content of which is hereby incorporated by reference.

BACKGROUND OF THE INVENTION

1. Field of the Invention

The present invention relates to information security techniques that use prime number generation.

2. Related Art

Data communication that uses computer and communication techniques has become pervasive in recent years. Secret communication or digital signature techniques are used in such data communication.

Secret communication techniques allow communication to be performed without the communicated content being revealed to third parties. Digital signature techniques, meanwhile, enable a receiver to verify whether the communicated content is valid or whether the information is from the stated sender.

1. Public Key Cryptography

Such secret communication or digital signature techniques use a cryptography called public key encryption. Public key encryption provides a convenient method for managing the separate encryption keys of many users, and so has become a fundamental technique for performing communication with a large number of users. In secret communication based on public key encryption, different keys are used for encryption and decryption, with the decryption key being kept secret and the encryption key being made public. Hereinafter, a decryption key which is kept secret is called a "secret key", whereas an encryption key which is made public is called a "public key".

The RSA (Rivest-Shamir-Adelman) cryptosystem is one type of public key cryptography. The RSA cryptosystem relies on the computational difficulty of factoring an integer, for its security. The prime factorization problem is the following. When integer $n=p \times q$ is given where p and q are primes, find p and q. Here, "x" represents normal multiplication.

The prime factorization problem is described in detail in T. Okamoto & K. Ohta (1990) *Encryption, Zero Knowledge Proofs, and Number Theory*, published by Kyoritsu, pp. 144–151.

(RSA Cryptosystem Using the Prime Factorization Problem)

The RSA cryptosystem that uses the prime factorization problem is explained below.

(1) Generation of Keys

A public key and a secret key are generated in the following manner.

(a) Select two large primes p and q at random, and form their product $n=p \times q$.

(b) Find the least common multiple of p−1 and q−1, i.e., $L=LCM(p-1,q-1)$.

(c) Select integer e at random which is relatively prime to and smaller than L:

$1 \leq e \leq L-1$, $GCD(e,L)=1$ where GCD(e,L) denotes the greatest common divisor of e and L.

(d) Calculate $d=e^{-1} \mod L$.

The pair of integers n and e is the public key, whereas the pair of integers n and d is the secret key.

(2) Generation of Ciphertext

Plaintext m is encrypted using public key (n,e), to obtain ciphertext c:

$c=m^e \mod n$ (3) Generation of Decrypted Text

Ciphertext c is decrypted using secret key (n,d), to obtain decrypted text m':

$m'=c^d \mod n$

Here, $$m' = c^d \mod n$$
$$= (m^e)^d \mod n$$
$$= m ** (e \times d \mod L) \mod n$$
$$= m^1 \mod n$$
$$= m \mod n$$

Therefore, decrypted text m' matches plaintext m.

Note that in this specification the operator "" represents exponentiation, so that $Ax=A^x$ where A is multiplied by itself x times.

The RSA cryptosystem is described in detail in T. Okamoto & H. Yamamoto (1997) *Modern Encryption*, published by Sangyo Tosho, pp. 110–113.

2. Related Art 1—Probabilistic Prime Generation Algorithm

To generate a public key in the above RSA cryptosystem that uses the prime factorization problem, prime generation is performed. Prime generation is described in detail in A. J. Menezes, P. C. van Oorschot, & S. A. Vanstone (1997) *Handbook of Applied Cryptography*, published by CRC Press, pp. 145–154.

A probabilistic prime generation algorithm as a conventional technique is explained below. The probabilistic prime generation algorithm applies the Rabin-Miller test to determine the primality of a number. The Rabin-Miller test is described in detail in A. J. Menezes, P. C. van Oorschot, & S. A. Vanstone (1997) *Handbook of Applied Cryptography*, published by CRC Press, pp. 138–140. The Rabin-Miller test determines a number, which has a high probability of being prime, as a prime. This does not mean that the number is definitely prime.

Suppose natural number x and small primes $L_1, L_2, \ldots, L_n$ are given beforehand. As one example, $L_1, L_2, \ldots, L_n$ are 2, 3, 5, 7.

The probabilistic prime generation algorithm generates a prime by repeating the following steps.

(step 1) Assign natural number x to variable N as an initial value.

(step 2) Find the smallest number that is not divisible by any of $L_1, L_2, \ldots, L_n$, among numbers larger than variable N. Assign the number to variable N.

(step 3) Test the primality of variable N. The primality test here is done by repeating the Rabin-Miller test ten times. If variable N passes the primality test, output variable N as a prime. If variable N fails the primality test, return to step 2 and repeat the procedure until a prime is output.

Here, finding the number that is not divisible by any of the small primes 2, 3, 5, 7 in step 2 has the effect of reducing the number of times the primality test is performed. In other words, step 2 limits the numbers to test for primality, to those numbers which are not divisible by any of 2, 3, 5, 7. There are 47 numbers where 2xx+1 mod 210 is not divisible by any of 2, 3, 5, 7. Accordingly, if the numbers to test for primality are limited to those which are not divisible by any of 2, 3, 5, 7, the number of times the primality test is performed can be reduced by $47/210$.

On the other hand, even if variable N obtained in step 2 is a composite number (i.e. not a prime), variable N has at most ¼ chance of passing the Rabin-Miller test. Which is to say, even if variable N is composite, it may pass the Rabin-Miller test. Thus, the above probabilistic prime generation algorithm can generate a prime only probabilistically, and not definitely.

(Computational Complexity of the Probabilistic Prime Generation Algorithm)

Computational complexity of generating a prime using the above probabilistic prime generation algorithm is explained next. Here, computational complexity is measured as the number of modular exponentiations.

According to the above probabilistic prime generation algorithm, the Rabin-Miller test is repeated ten times for a number which may be prime. The following calculates the average number of times the Rabin-Miller test is performed for one composite number.

Let $P_i$ be a probability of performing the ith test. Then a probability $P_{i+1}$ of performing the (i+1)th test is no greater than the product of the probability, $P_i$, of performing the ith test and the probability, ¼, of passing this ith test. Which is to say, the probability of performing the (i+1)th test is $$P_{i+1} \leq P_i \times \frac{1}{4}$$

Since the first test is definitely performed, the probability of the first test is 1, that is, $P_1=1$. Accordingly, $$P_i \leq (1/4)^{**}(i-1)$$

One modular exponentiation is performed for one Rabin-Miller test. The above probabilistic prime generation algorithm conducts at most ten Rabin-Miller tests in step 3. Therefore, the average number of modular exponentiations performed for one composite number is $$\sum_{i=1}^{10} P_i \leq \sum_{i=1}^{10} (1/4)^{**}(i-1) = 1.33$$

In general, when N is arbitrarily chosen, a probability of N being a prime is about $1/(\ln N)$. This means that one prime can be found when (ln N) primality tests are conducted on average. Here, (ln N) is a natural logarithm of N. Since the numbers which are divisible by any of 2, 3, 5, 7 have been excluded beforehand, the average number of primality tests to be conducted to find one prime can be reduced by $\phi(2\times3\times5\times7)/210=48/210$. Here, $\phi(2\times3\times5\times7)$ is the number of numbers, among the natural numbers less than 210, which are relatively prime to the small primes 2, 3, 5, 7. Hence the number of numbers which are tested for primality until one prime is found, that is, the total number of numbers which are judged as being composite and a number which is lastly judged as being prime, is $$8/35 \times (\ln N)$$

Since the last number is prime, the number of composite numbers which undergo the primality test is $$(8/35 \times (\ln N)) - 1$$

This being so, the number of modular exponentiations performed to find one prime is no greater than $$(8/35 \times (\ln N) - 1) \times \left( \sum_{i=1}^{10} 1/(4^{**}(n-1)) \right) + 10$$

on average. For example, when N is 512 bits, the number of modular exponentiations is at most 116.8. On the other hand, if the primality test is not limited to the numbers which are not divisible by any of 2, 3, 5, 7, that is, if all numbers are subjected to the primality test, then the number of modular exponentiations performed to find one prime is no greater than $$((\ln N) - 1) \times \left( \sum_{i=1}^{10} 1/(4^{**}(n-1)) \right) + 10$$

on average. When N is 512 bits, the number of modular exponentiations is at most 481.9. Thus, the number of modular exponentiations can be reduced to about ¼ according to the related art 1. However, this method, has the aforementioned problem of not being able to generate a definite prime.

3. Related Art 2—Deterministic Prime Generation Algorithm

A deterministic prime generation method using the Maurer algorithm that can generate a prime with an absolute certainty is explained below. The Maurer algorithm is described in detail in A. J. Menezes, P. C. van Oorschot, & S. A. Vanstone (1997) *Handbook of Applied Cryptography*, published by CRC Press, pp. 152–153.

The deterministic prime generation algorithm generates a prime by repeating the following steps. Here, prime q whose bit size is demoted by lenq is given in advance.

(step 1) Select random number R of (lenq−1) bits, where the first bit of random number R is set to be definitely 1.

(step 2) Calculate number N according to the following equation:

$$N = 2 \times q \times R + 1$$

(step 3) See whether the following first and second criteria are met, and judge number N as being prime if both are met. Otherwise, judge number N as not being prime.

$2^{N-1} = 1 \mod N$ (First Criterion)

$GCD(2^{2R}-1, N) = 1$ (Second Criterion)

If number N is judged as being prime, output number N as a prime. Otherwise, return to step 1 and repeat the procedure until a prime is output.

This primality test is called the Pocklington test, and described in detail in A. J. Menezes, P. C. van Oorschot, & S. A. Vanstone (1997) *Handbook of Applied Cryptography*, published by CRC Press, p. 144.

According to the Pocklington test, if q in the equation $N=2\times q\times R+1$ is prime and the first and second criteria are met, N is definitely prime. This enables primality to be deterministically judged, with it being possible to generate a definite prime.

Thus, the Maurer deterministic prime generation algorithm generates prime N whose size is 2×lenq, based on prime q whose size is lenq.

In other words, to generate a prime of a predetermined length using the Maurer deterministic prime generation algorithm, the generation of a prime no greater than the predetermined length needs to be repeatedly performed. For example, to generate a 512-bit prime, first a 16-bit prime is generated based on an 8-bit prime which has been given beforehand. Next, a 32-bit prime is generated based on the 16-bit prime, and then a 64-bit prime is generated based on the 32-bit prime. The prime generation is repeated in this way, as a result of which a 512-bit prime is obtained.

Note here that the above second criterion can be replaced by $$2^{2R} \neq 1 \bmod N$$

(Computational Complexity of the Deterministic Prime Generation Algorithm)

Computational complexity of generating a prime using the Maurer deterministic prime generation algorithm is as follows.

Here, computational complexity is measured as the number of modular exponentiations for a 512-bit number. Which is to say, consider the case where a 512-bit prime is generated using a 256-bit prime.

Generally, when arbitrarily selecting positive integer R, a probability of positive integer R being prime is about $1/(\ln R)$. This being so, the number of times the Pocklington test is conducted to find a 512-bit prime can be estimated at $\ln 2^{512}$. Since the primality test is conducted only for odd numbers in the related art 2, the number of Pocklington tests is $(\ln 2^{512})/2$.

A probability of meeting the first criterion is at most ¼, which is equal to the probability of passing the Rabin-Miller test. Accordingly, the number of modular exponentiations performed for one composite number is no greater than 1+¼. Meanwhile, the number of modular exponentiations performed for one prime is 2.

Therefore, the number of 512-bit modular exponentiations performed to generate a 512-bit prime from a 256-bit prime is no greater than $$(1+¼) \ ((\ln 2^{512})/2-1)+2=222.6$$

Likewise, in the case where a 256-bit prime is generated from a 128-bit prime, the number of Pocklington tests is $(\ln 2^{256})/2$. Hence the number of 256-bit modular exponentiations performed to generate a 256-bit prime is no greater than $$(1+¼) \ ((\ln 2^{256})/2-1)+2$$

Computational complexity of modular exponentiation depends on the modulus N, and is the order of $N^3$. Therefore, eight 256-bit modular exponentiations can be regarded as being equivalent to one 512-bit modular exponentiation.

When other cases such as generating a 128-bit prime from a 64-bit prime are considered in the same way, the total computational complexity of the related art 2 can be measured as the number of 512-bit modular exponentiations.

Here, computational complexity of generating a 16-bit or 32-bit prime is much smaller than computational complexity of generating a 64-bit, 128-bit, 256-bit, or 512-bit prime, so that the computational complexity for 16-bit and 32-bit primes can be ignored. This being so, when expressed as the number of 512-bit modular exponentiations, the total computational complexity of the related art 2 is no greater than $$(1+¼)\times\{((\ln 2^{64})/2-1)/512+((\ln 2^{128})/2-1)/64+((\ln 2^{256})/2-1)/8+((\ln 2^{512})/2-1)\}+2(1/512+1/64+1/8+1)=237.4$$

The computational complexity of the related art 2 is at least twice as much as the computational complexity of the related art 1 which is no greater than 116.8. Thus, the related art 2 takes more computational complexity than the related art 1, though it can generate a prime deterministically.

In short, prime generation has the following problem. If an algorithm with small computational complexity is employed, primes cannot be generated deterministically. On the other hand, if an algorithm that can generate primes deterministically is employed, computational complexity increases.

SUMMARY OF THE INVENTION

The present invention has an object of solving the above problem and providing a prime number generation device, prime number generation method, prime number generation program, recording medium storing a prime number generation program, and information security device that are capable of deterministically generating primes with small computational complexity.

The stated object can be achieved by an information security device that handles predetermined information securely and reliably based on an intractability of factorization, by generating two primes and using a multiplication of the two primes, including: an acquiring unit for acquiring a known prime q and n number of known primes $L_1, L_2, \ldots, L_n$, where $L_1, L_2, \ldots, L_n$ are primes, other than 2, that are smaller than the prime q, and the prime q satisfies $q=1 \bmod L_i$ ($i=1, 2, \ldots, n$); a generating unit for generating a number N whose bit length is twice as large as a bit length of the prime q, where numbers that relate to any of the primes $L_1, L_2, \ldots, L_n$ are excluded from the generation of the number N; and a judging unit for judging primality of the number N, and outputting the number N as a prime if the number N is judged as being prime.

With this construction, primes can be generated deterministically. Also, computational time can be shortened when compared with the conventional techniques.

Here, the generating unit may include: a random number generating unit for generating a random number R' whose bit length is (Lenq−LenL−1), where Lenq is the bit length of the prime q and LenL is a bit length of $(L_1 \times L_2 \times \ldots \times L_n)$; and a judgement target generating unit for (a) generating a number R $$R=L_1 \times L_2 \times \ldots \times L_n \times R'$$

using the random number R' and the primes $L_1, L_2, \ldots, L_n$, and (b) generating the number N $$N=2 \times R \times q+1$$

using the prime q and the number R, wherein the judging unit judges the primality of the number N, using the number N and the number R generated by the judgement target generating unit.

With this construction, computational time can be shortened.

Here, the generating unit may include: a partial information generating unit for generating a number u that satisfies $$2 \times u \times q+1 \neq 0 \bmod L_i (i=1, 2, \ldots, n)$$

using the prime q; a random number generating unit for generating a random number R'; a judgement target generating unit for (a) generating a number R $$R=u+L_1 \times L_2 \times \ldots \times L_n \times R'$$

using the primes $L_1, L_2, \ldots, L_n$, the number u, and the random number R', and (b) generating the number N $$N = 2 \times R \times q + 1$$

using the prime q and the number R, wherein the judging unit judges the primality of the number N, using the number N and the number R generated by the judgement target generating unit.

With this construction, computational time can be shortened without limiting the type of prime which can be generated.

BRIEF DESCRIPTION OF THE DRAWINGS

These and other objects, advantages and features of the invention will become apparent from the following description thereof taken in conjunction with the accompanying drawings which illustrate specific embodiments of the invention.

In the drawings.

DESCRIPTION OF THE PREFERRED EMBODIMENTS

1. First Embodiment

The following is a description of a content delivery system 1 which is one embodiment of the present invention.

1.1. Construction of the Content Delivery System 1

Figure 1:
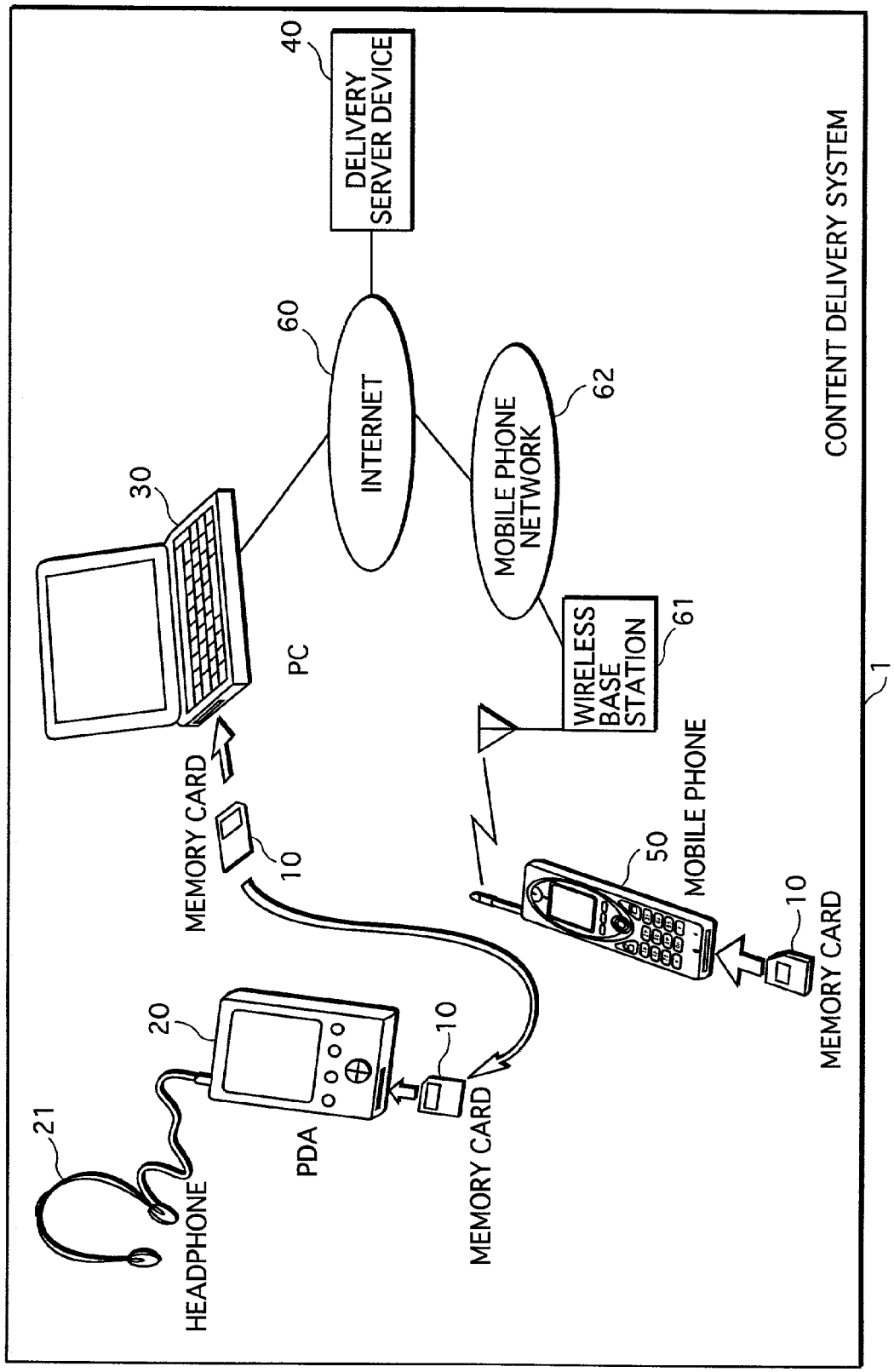
FIG. 1 is a block diagram showing a construction of a content delivery system.

The content delivery system 1 includes a memory card 10, a personal digital assistant (PDA) 20, a headphone 21, a personal computer (PC) 30, a delivery server device 40, and a mobile phone 50, as shown in FIG. 1.

The delivery server device 40 encrypts a digital work of music, and transmits the encrypted digital work to the PC 30 via the Internet 60. The PC 30 receives the encrypted digital work.

The user inserts the memory card 10 into the PC 30. The PC 30 writes the encrypted digital work to the memory card 10. The memory card 10 decrypts the encrypted digital work to obtain the original digital work, and stores the obtained digital work. The user inserts the memory card 10 into the PDA 20. Here, the PDA 20 is connected to the headphone 21. The PDA 20 converts the digital work written in the memory card 10 to an electric signal, and outputs the electric signal to the headphone 21. The headphone 21 converts the electric signal to sounds and outputs the sounds.

Also, the delivery server device 40 encrypts a digital work of music, and transmits the encrypted digital work to the mobile phone 50 via the Internet 60, a mobile phone network 62, and a wireless base station 61. The mobile phone 50 receives the encrypted digital work.

The user inserts the memory card 10 into the mobile phone 50. The mobile phone 50 writes the encrypted digital work to the memory card 10. The memory card 10 decrypts the encrypted digital work to obtain the original digital work, and stores the obtained digital work. The mobile phone 50 converts the digital work stored in the memory card 10 to an electric signal, converts the electric signal to sounds, and outputs the sounds.

Thus, the user can receive a digital work of music from the delivery server device 40 and enjoy playing the music.

1.2. Memory Card 10

Figure 2:
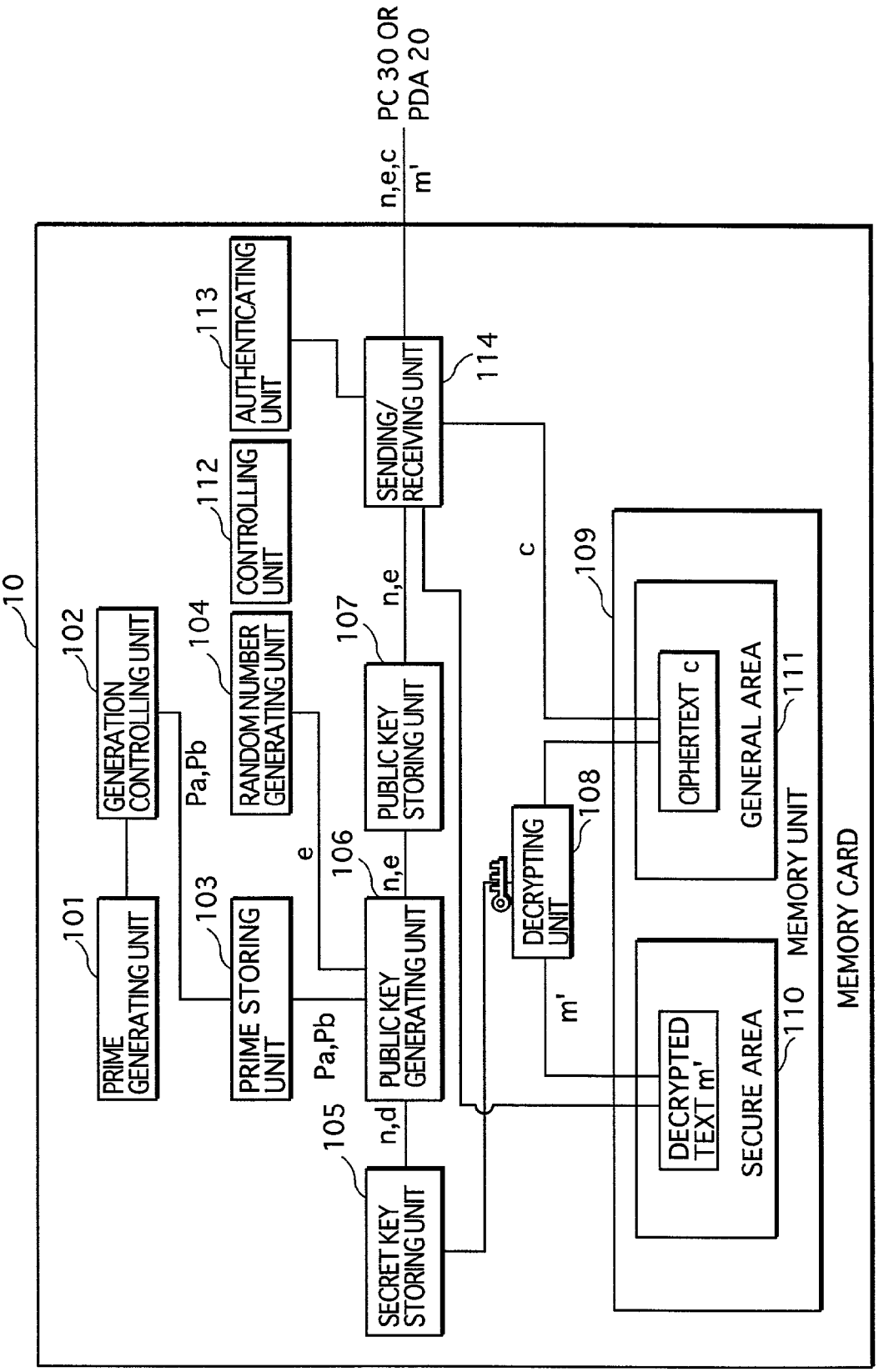
FIG. 2 is a block diagram showing a construction of a memory card shown in FIG. 1.

The memory card 10 includes a prime generating unit 101, a generation controlling unit 102, a prime storing unit 103, a random number generating unit 104, a secret key storing unit 105, a public key generating unit 106, a public key storing unit 107, a decrypting unit 108, a memory unit 109, a controlling unit 112, an authenticating unit 113, and a sending/receiving unit 114, as shown in FIG. 2.

The memory card 10 is actually realized by a computer system that is roughly made up of a microprocessor, a ROM, and a RAM. A computer program is stored in the RAM, with the microprocessor operating in accordance with this computer program to achieve the functions of the memory card 10.

(1) Secret Key Storing Unit 105

The secret key storing unit 105 has an area for storing a pair of numbers n and d as a secret key.

(2) Public Key Storing Unit 107

The public key storing unit 107 has an area for storing a pair of numbers n and e as a public key.

(3) Memory Unit 109

The memory unit 109 is made up of a general area 111 and a secure area 110. The general area 111 and the secure area 110 are used to store information. The general area 111 can be read/written freely by an external device. On the other hand, the secure area 110 can be read/written only if the authenticating unit 113 authenticates a device in which the memory card 10 is inserted.

(4) Prime Storing Unit 103

The prime storing unit 103 has an area for storing primes $P_a$ and $P_b$.

(5) Generation Controlling Unit 102

The generation controlling unit 102 outputs prime q, bit size Lenq of prime q, small primes $L_1, L_2, \ldots, L_n$ other than 2, and bit size LenL of $(L_1 \times L_2 \times \ldots \times L_n)$ to the prime generating unit 101. The generation controlling unit 102 then receives prime p from the prime generating unit 101, and writes prime p to the prime storing unit 103 as prime $p_a$.

Next, the generation controlling unit 102 outputs prime q, bit size Lenq of prime q, small primes $L_1, L_2, \ldots, L_n$ other than 2, and bit size LenL of $(L_1 \times L_2 \times \ldots \times L_n)$, to the prime generating unit 101 again. The generation controlling unit 102 then receives prime p from the prime generating unit 101, and writes prime p to the prime storing unit 103 as prime $p_b$.

Prime q, bit size Lenq of prime q, small primes $L_1, L_2, \ldots, L_n$ other than 2, and bit size LenL of $(L_1 \times L_2 \times \ldots \times L_n)$ are described in detail later.

Thus, the generation controlling unit 102 controls the prime generating unit 101 twice, to generate two primes. Since the prime generating unit 101 uses a random number to generate a prime as described later, a second prime generated by the prime generating unit 101 has a very low probability of matching a first prime generated by the prime generating unit 101. However, the generation controlling unit 102 may control the prime generating unit 101 to regenerate the second prime if the second prime happens to match the first prime, to make sure that the two primes are definitely different with each other.

Also, the generation controlling unit 102 uses a set of parameters made up of prime q, bit size Lenq, primes $L_1$, $L_2$, . . . , $L_n$, and bit size LenL in each of the two prime generation operations, but the generation controlling unit 102 may use a different set of parameters in each of the two prime generation operations.

In more detail, the generation controlling unit 101 may use the set of parameters made up of prime q, bit size Lenq, n primes $L_1$, $L_2$, . . . , $L_n$, and bit size LenL in the first prime generation operation, and a set of parameters made up of prime q', bit size Lenq' of prime q', j primes $L_1'$, $L_2'$, . . . , $L_j'$ other than 2, and bit size LenL' of ($L_1' \times L_2' \times \ldots \times L_j'$) in the second prime generation operation.

Here, q≠q' and n≠j. Also, ($L_1$, $L_2$, . . . , $L_n$)≠($L_1'$, $L_2'$, . . . $L_j'$), meaning that at least one prime out of ($L_1$, $L_2$, . . . $L_n$) differs with any one prime out of ($L_1'$, $L_2'$, . . . , $L_j'$)

(6) Prime Generating Unit 101

Figure 3:
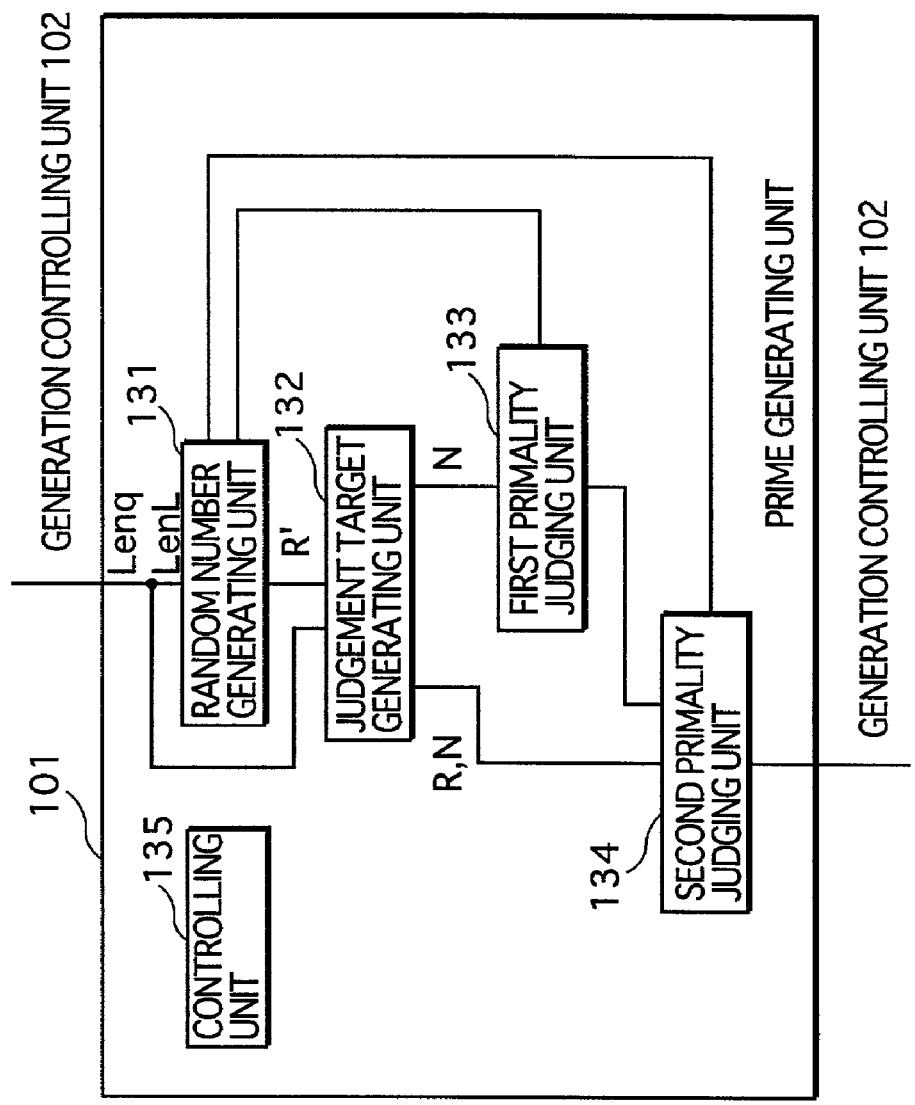
FIG. 3 is a block diagram showing a construction of a prime generating unit shown in FIG. 2.

The prime generating unit 101 includes a random number generating unit 131, a judgement target generating unit 132, a first primality judging unit 133, a second primality judging unit 134, and a controlling unit 135, as shown in FIG. 3.

When prime q that satisfies q=1 mod L q=1 mod $L_2$

. . .

q=1 mod $L_n$ is given together with bit size Lenq of prime q, the prime generating unit 101 outputs prime p whose bit size is twice the bit size of prime q.

Here, $L_1$, $L_2$, . . . , $L_n$ are small primes other than 2.

Also, bit size LenL of ($L_1 \times L_2 \times \ldots \times L_n$) is given beforehand.

For example, $L_1$, $L_2$, . . . , $L_n$ are primes smaller than an expected bit size of input prime q, such as $L_1$=3 and $L_2$=5.

(Random Number Generating Unit 131)

The random number generating unit 131 receives bit size Lenq and bit size LenL from the generation controlling unit 102, and uses them to generate random number R' whose bit size is (Lenq−LenL−1). The random number generating unit 131 outputs random number R' to the judgement target generating unit 132.

The random number generating unit 131 also receives first judgement information from the first primality judging unit 133, and second judgement information from the second primality judging unit 134 (the first and second judgement information is described in detail later). Upon receiving the first or second judgement information, the random number generating unit 131 regenerates random number R' whose bit size is (Lenq−LenL−1), using bit size Lenq and bit size LenL. The random number generating unit 131 then outputs random number R' to the judgement target generating unit 132.

(Judgement Target Generating Unit 132)

The judgement target generating unit 132 receives prime q from the generation controlling unit 102, and random number R' from the random number generating unit 131.

The judgement target generating unit 132 uses prime q and random number R' to generate numbers R and N that satisfy the following equations:

$$R = L_1 \times L_2 \times \ldots \times L_n \times R'$$

$$N = 2 \times R \times q + 1$$

The judgement target generating unit 132 outputs number R to the second primality judging unit 134, and number N to the first primality judging unit 133 and second primality judging unit 134.

(First Primality Judging Unit 133)

The first primality judging unit 133 receives number N from the judgement target generating unit 132, and judges whether the following judgement formula 1 holds true:

$$2^{N-1} = 1 \bmod N \qquad \text{(Judgement Formula 1)}$$

If the judgement formula 1 holds, the first primality judging unit 133 outputs first judgement information indicating that the judgement formula 1 holds, to the second primality judging unit 134. Otherwise, the first primality judging unit 133 outputs first judgement information indicating that the judgement formula 1 does not hold, to the random number generating unit 131.

(Second Primality Judging Unit 134)

The second primality judging unit 134 receives numbers N and R from the judgement target generating unit 132. The second primality judging unit 134 also receives the first judgement information indicating that the judgement formula 1 holds, from the first primality judging unit 133.

Upon receiving the first judgement information, the second primality judging unit 134 uses numbers N and R to judge whether the following judgement formula 2 holds true:

$$2^{2R} \neq 1 \bmod N \qquad \text{(Judgement Formula 2)}$$

If the judgement formula 2 holds, the second primality judging unit 134 outputs number N to the generation controlling unit 102 as prime p. Otherwise, the second primality judging unit 134 outputs second judgement information indicating that the judgement formula 2 does not hold, to the random number generating unit 131.

(Controlling Unit 135)

The controlling unit 135 controls each construction element of the prime generating unit 101.

(Verification of the Prime Generating Unit 101)

The judgements made by the first and second primality judging units 133 and 134 are the Pocklington test. The Pocklington test is described in detail in E. Okamoto (1993) *An Introduction to Encryption Theory*, published by Kyoritsu, p. 21 and A. J. Menezes, P. C. van Oorschot, & S. A. Vanstone (1997) *Handbook of Applied Cryptography*, published by CRC Press, p. 144.

If q in N=2×R×q+1 is prime and both of $$2^{N-1} = 1 \bmod N$$

and $$2^{2R} \neq 1 \bmod N$$

hold true, then N is prime. Accordingly, the prime generating unit 101 outputs number N as a prime. Also, since the bit size of random number R' is (Lenq−LenL−1), the bit size of number R is Lenq−1. Hence the bit size of number N is 2×Lenq.

(7) Public Key Generating Unit 106

The public key generating unit 106 reads primes $p_a$ and $p_b$ from the prime storing unit 103. The public key generating unit 106 multiplies primes $p_a$ and $p_b$ together to find integer $n=p_a \times p_b$, and writes integer n to the secret key storing unit 105 and public key storing unit 107. The public key generating unit 106 also computes the least common multiple of numbers $(p_a-1)$ and $(p_b-1)$, namely, $L=LCM(p_a-1,p_b-1)$ The public key generating unit 106 receives random number e from the random number generating unit 104, and calculates number $d=e^{-1} \bmod L$. The public key generating unit 106 writes number d to the secret key storing unit 105, and random number e to the public key storing unit 107.

(8) Random Number Generating Unit 104

The random number generating unit 104 generates random number e, and outputs random number e to the public key generating unit 106.

(9) Sending/Receiving Unit 114

The sending/receiving unit 114 reads integer n and random number e from the public key storing unit 107, and outputs them to the PC 30.

Also, the sending/receiving unit 114 receives ciphertext c from the delivery server device 40 via the Internet 60 and the PC 30, and writes ciphertext c to the general area 111 of the memory unit 109.

(10) Decrypting Unit 108

The decrypting unit 108 reads ciphertext c from the general area 111, and reads number d and integer n from the secret key storing unit 105. The decrypting unit 108 decrypts ciphertext c using number d and integer n according to the following equation, to obtain decrypted text m'.

$$m'=c^d \bmod n$$

The decrypting unit 108 writes decrypted text m' to the secure area 110 of the memory unit 109.

(11) Authenticating Unit 113

The authenticating unit 113 authenticates a device in which the memory card 10 is inserted. If the authentication has succeeded, the authenticating unit 113 permits the device to read/write the secure area 110 of the memory unit 109.

(12) Controlling Unit 112

The controlling unit 112 controls each construction element of the memory card 10.

1.3. PC 30

Figure 4:
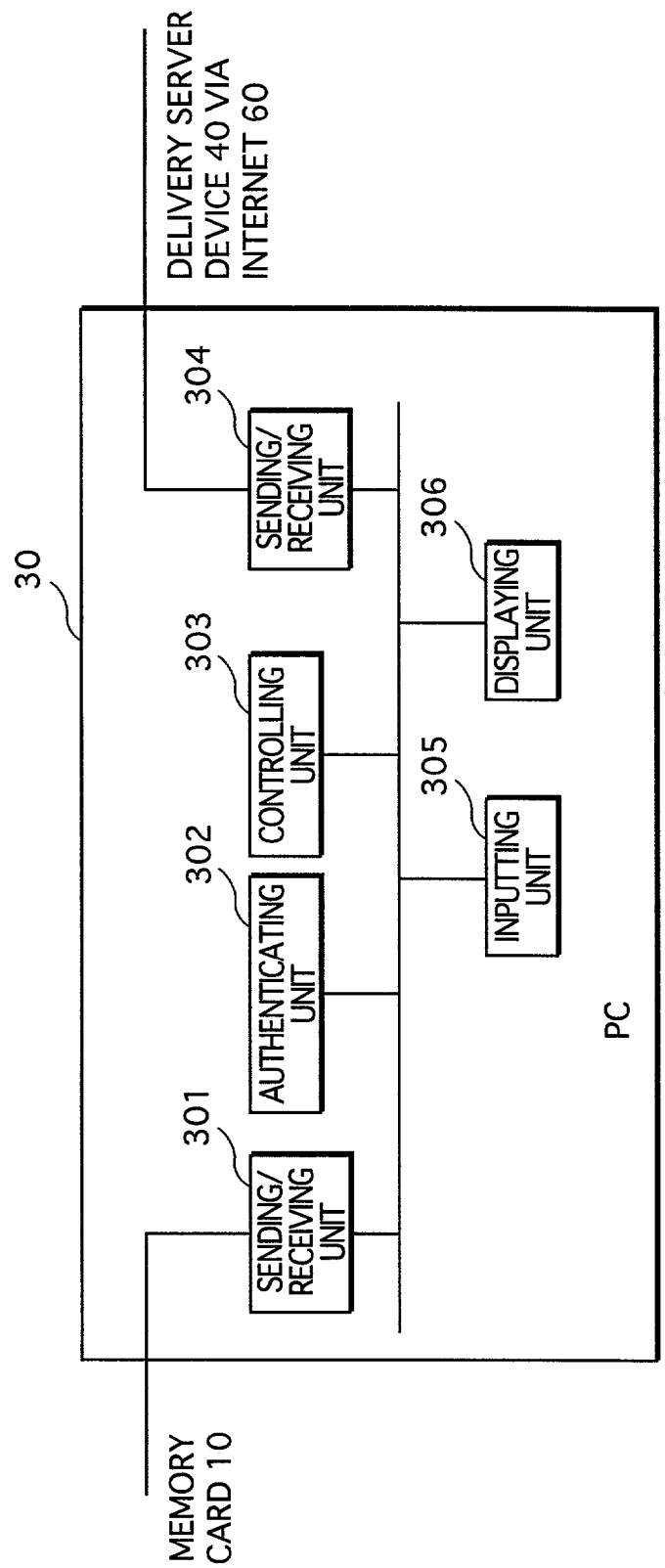
FIG. 4 is a block diagram showing a construction of a PC shown in FIG. 1.

The PC 30 includes a sending/receiving unit 301, an authenticating unit 302, a controlling unit 303, a sending/receiving unit 304, an inputting unit 305, and a displaying unit 306, as shown in FIG. 4.

The PC 30 is actually realized by a computer system that is roughly made up of a microprocessor, a ROM, a RAM, a hard disk unit, an LCD (liquid crystal display) unit, a keyboard, and a mouse. A computer program is stored in the RAM or the hard disk unit, with the microprocessor operating in accordance with this computer program to achieve the functions of the PC 30.

The PC 30 receives integer n and random number e from the memory card 10, and sends them to the delivery server device 40 via the Internet 60. The PC 30 also receives ciphertext c from the delivery server device 40 via the Internet 60, and sends it to the sending/receiving unit 114 in the memory card 10.

1.4. Delivery Server Device 40

Figure 5:
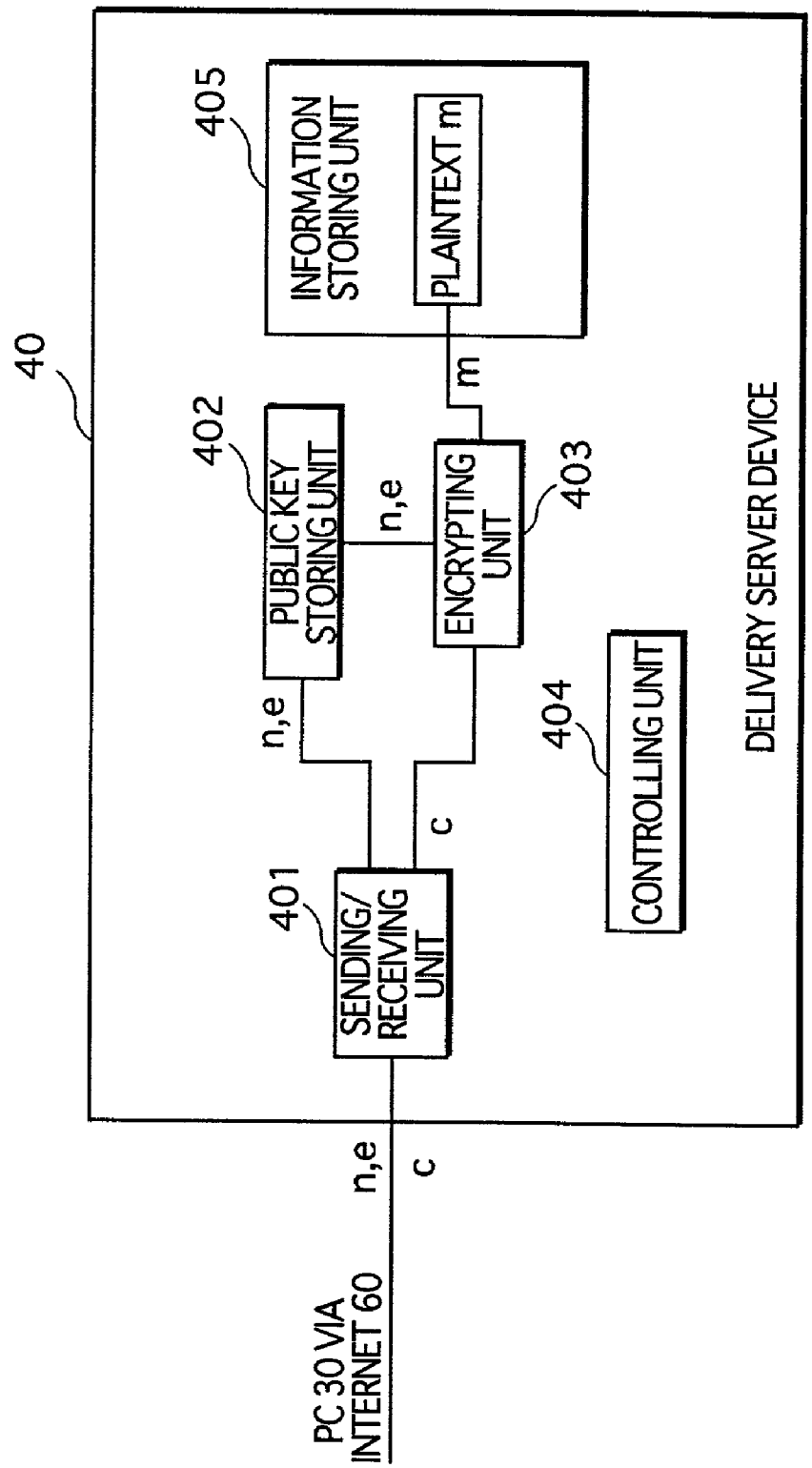
FIG. 5 is a block diagram showing a construction of a delivery server device shown in FIG. 1.

The delivery server device 40 includes a sending/receiving unit 401, a public key storing unit 402, an encrypting unit 403, a controlling unit 404, and an information storing unit 405, as shown in FIG. 5.

Like the PC 30, the delivery server device 40 is a computer system including a microprocessor which operates in accordance with a computer program to achieve the functions of the delivery server device 40.

(1) Information Storing Unit 405

The information storing unit 405 stores plaintext m in advance. In detail, plaintext m is digital music information.

(2) Public Key Storing Unit 402

The public key storing unit 402 has an area for storing the pair of integer n and random number e as a public key.

(3) Sending/Receiving Unit 401

The sending/receiving unit 401 receives integer n and random number e from the PC 30 via the Internet 60, and writes them to the public key storing unit 402.

The sending/receiving unit 401 also receives ciphertext c from the encrypting unit 403, and sends it to the PC 30 via the Internet 60.

(4) Encrypting Unit 403

The encrypting unit 403 reads plaintext m from the information storing unit 405, and reads integer n and random number e from the public key storing unit 402. The encrypting unit 403 encrypts plaintext m using integer n and random number e according to the following equation, to generate ciphertext c.

$$c=m^e \bmod n$$

The encrypting unit 403 outputs ciphertext c to the sending/receiving unit 401.

(5) Controlling Unit 404

The controlling unit 404 controls each construction element of the delivery server device 40.

1.5. PDA 20 and Headphone 21

The PDA 20 reads decrypted text m' from the secure area 110 of the memory unit 109 in the memory card 10, converts decrypted text m' to an analog audio signal, and outputs it to the headphone 21.

The headphone 21 converts the audio signal to sounds and outputs the sounds.

1.6. Mobile Phone 50

The mobile phone 50 has a construction of a mobile phone that is capable of communication with another phone using a radio wave, and also has the same constructions as the PC 30 and PDA 20.

The mobile phone 50 is actually realized by a computer system that is roughly made up of a microprocessor, a ROM, a RAM, an LCD unit, an input unit, a communication unit, a microphone, and a speaker. A computer program is stored in the RAM, with the microprocessor operating in accordance with this computer program to achieve the functions of the mobile phone 50.

The mobile phone 50 receives integer n and random number e from the memory card 10, and sends them to the delivery server device 40 via the Internet 60, in the same way as the PC 30. The mobile phone 50 also receives ciphertext c from the delivery server device 40 via the Internet 60, and sends it to the sending/receiving unit 114 in the memory card 10.

Also, the mobile phone 50 converts a digital work stored in the memory card 10 to an electric signal, converts the electric signal to sounds, and outputs the sounds, in the same way as the PDA 20.

1.7. Operation of the Content Delivery System 1

(1) Overall Operation of the Content Delivery System 1

Figure 6:
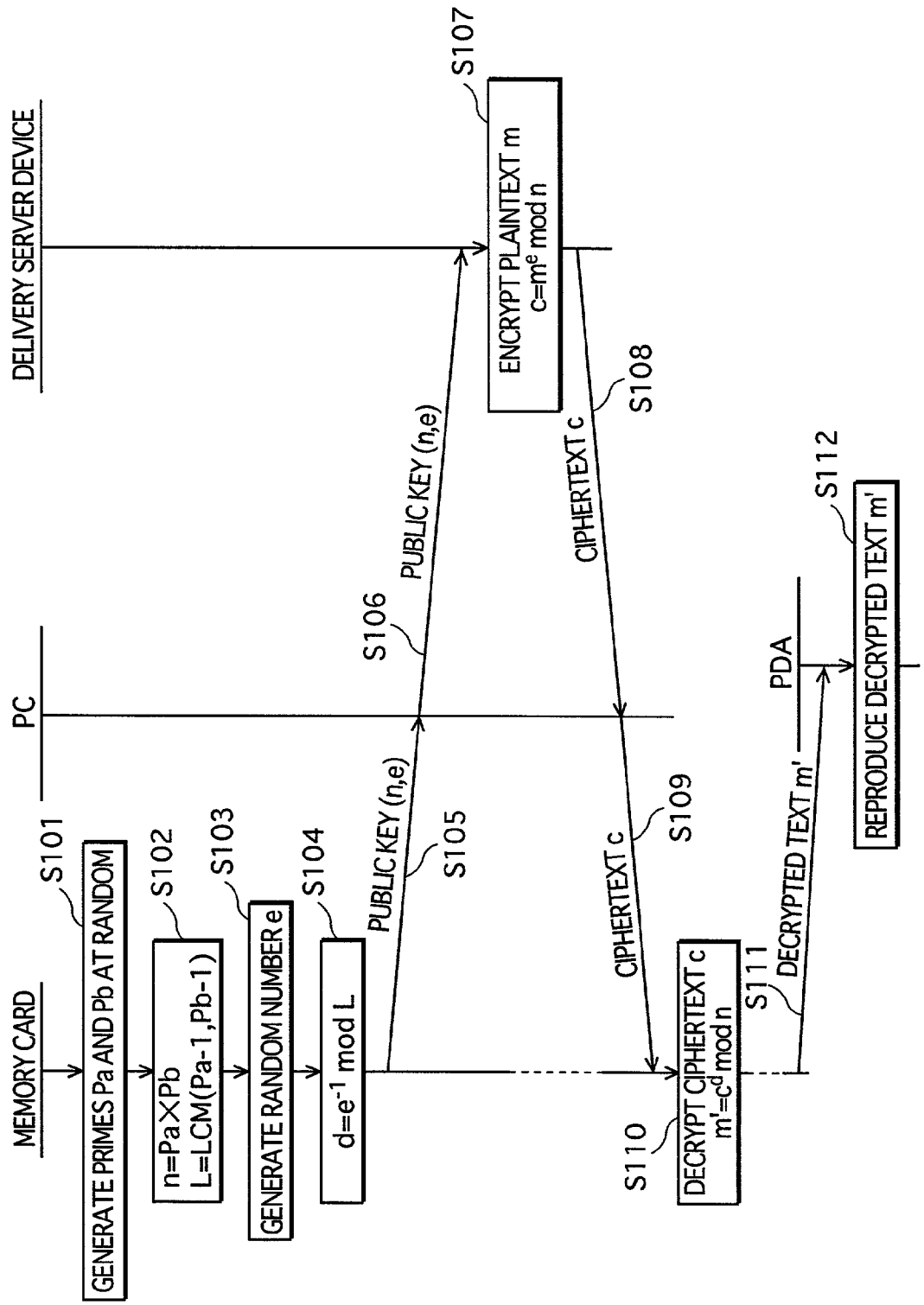
FIG. 6 is a flowchart showing an operation of the content delivery system.

An operation of the content delivery system 1 is explained below, by referring to FIG. 6.

The prime generating unit 101 in the memory card 10 generates primes $p_a$ and $p_b$ at random, and writes them to the prime storing unit 103 (S101). The public key generating unit 106 reads primes $p_a$ and $p_b$ from the prime storing unit 103, and multiplies them together to form integer $n=p_a \times p_b$. The public key generating unit 106 writes integer n to the secret key storing unit 105 and public key storing unit 107. The public key generating unit 106 also calculates the least common multiple $L=LCM(p_a-1,p_b-1)$ of numbers $(p_a-1)$ and $(p_b-1)$ (S102) The random number generating unit 104 generates random number e, and outputs it to the public key generating unit 106 (S103). The public key generating unit 106 receives random number e, and calculates number $d=e^{-1}$ mod L. The public key generating unit 106 writes number d to the secret key storing unit 105, and random number e to the public key storing unit 107 (S104). The sending/receiving unit 114 reads integer n and random number e from the public key storing unit 107, and outputs them to the PC 30 (S105). The PC 30 sends integer n and random number e to the delivery server device 40 via the Internet 60.

The public key storing unit 402 in the delivery server device 40 receives integer n and random number e from the PC 30 via the Internet 60 and the sending/receiving unit 401, and stores them (S106). The encrypting unit 403 reads plaintext m from the information storing unit 405, reads integer n and random number e from the public key storing unit 402, and encrypts plaintext m using integer n and random number e according to the following equation, to generate ciphertext c:

$c=m^e \mod n$ (S107). The encrypting unit 403 sends ciphertext c to the PC 30 via the sending/receiving unit 401 and the Internet 60 (S108). The PC 30 receives ciphertext c, and sends it to the sending/receiving unit 114 in the memory card 10. The sending/receiving unit 114 writes ciphertext c to the general area 111 of the memory unit 109 (S109). The decrypting unit 108 reads ciphertext c from the general area 111, reads number d and integer n from the secret key storing unit 105, and decrypts ciphertext c using number d and integer n according to the following equation, to obtain decrypted text m':

$m'=C^d \mod n$

The decrypting unit 108 writes decrypted text m' to the secure area 110 of the memory unit 109 (S110).

The PDA 20 reads decrypted text m' from the secure area 110 of the memory unit 109 in the memory card 10 (S111), and converts it to an analog audio signal. The PDA 20 outputs the audio signal to the headphone 21. The headphone 21 converts the audio signal to sounds, and outputs the sounds (S112).

Note here that the above operation of the memory card 10 is achieved by the controlling unit 112 controlling each construction element of the memory card 10.

(2) Operation of the Prime Generating Unit 101

Figure 7:
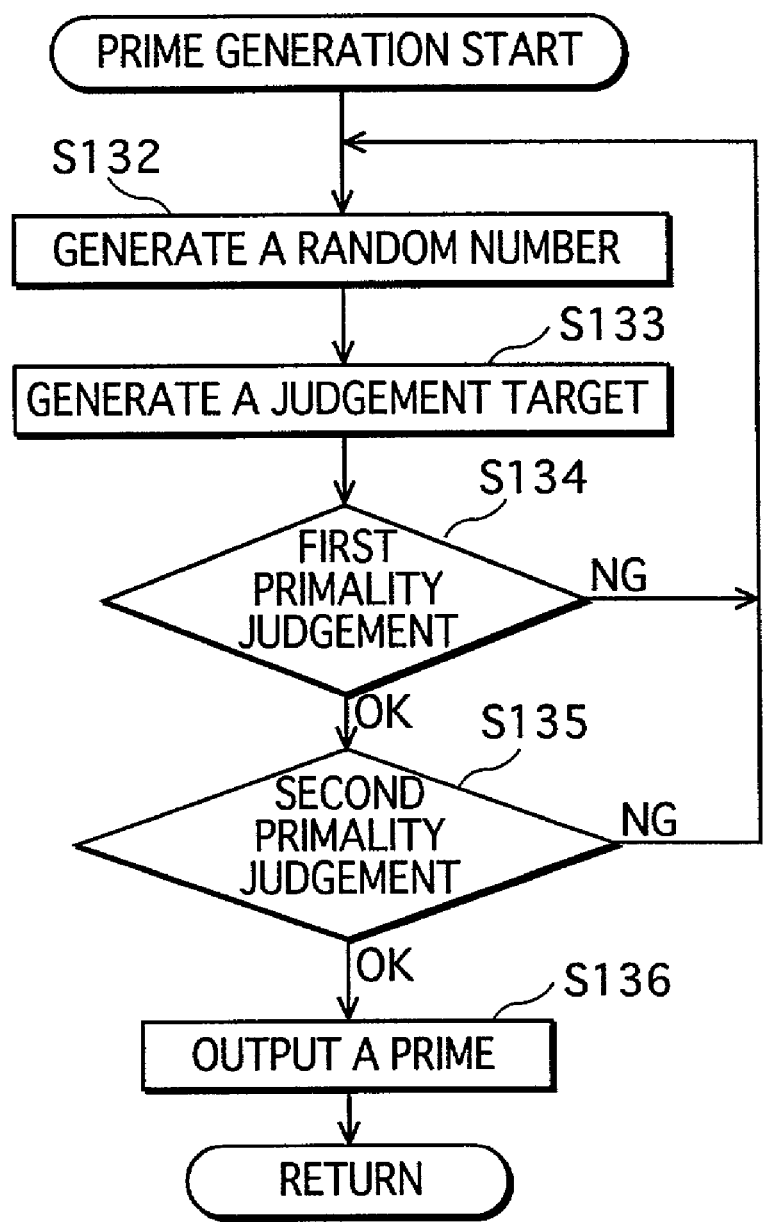
FIG. 7 is a flowchart showing an operation of the prime generating unit.

An operation of the prime generating unit 101 is explained below, with reference to FIG. 7.

The random number generating unit 131 generates random number R' of (Lenq−LenL−1) bits, and outputs it to the judgement target generating unit 132 (S132). The judgement target generating unit 132 computes numbers R and N, and outputs number N to the first primality judging unit 133 and numbers R and N to the second primality judging unit 134 (S133). The first primality judging unit 133 judges whether $2^{N-1}=1 \mod N$ (judgement formula 1). If the judgement formula 1 does not hold (S134:NG), the operation returns to step S132.

If the judgement formula 1 holds (S134:OK), the second primality judging unit 134 judges whether $2^{2R} \neq 1 \mod N$ (judgement formula 2). If the judgement formula 2 does not hold (S135:NG), the operation returns to step S132. If the judgement formula 2 holds (S135:OK), the second primality judging unit 134 outputs number N to the generation controlling unit 102 as a prime, thereby completing the operation.

It should be noted here that the above operation of the prime generating unit 101 is achieved by the controlling unit 135 controlling each construction element of the prime generating unit 101.

1.8. Evaluation of Computational Complexity

Computational complexity of the prime generating unit 101 is explained below.

Let $L_1=3$, $L_2=5$, $L_3=7$, n=3, and Lenq be 256 bits. This being the case, the number of modular exponentiations for 2×Lenq (=512 bits) is estimated as follows.

In general, when choosing number R at random, a probability of R being prime is about 1/(ln R). Therefore, the number of Pocklington tests to be performed to generate a 512-bit prime can be estimated at $\ln(2^{512})$. Here, ln R is a natural logarithm of R.

In the first embodiment, $$N = 2 \times R \times q + 1$$
$$= 2 \times L_1 \times L_2 \times \ldots \times L_n \times R' \times q + 1$$

so that

N=1 mod 2

N=1 mod $L_1$

N=1 mod $L_2$

. . .

N=1 mod $L_n$

Thus, N is not divisible by any of $L_1, L_2, \ldots, L_n$.

A probability of a number, which is mod $(2 \times L_1 \times L_2 \times \ldots \times L_n)$, not being divisible by any of 2, $L_1, L_2, \ldots, L_n$ is $\phi(2 \times L_1 \times L_2 \times \ldots \times L_n)/(L_1 \times L_2 \times \ldots \times L_n) = (2-1) \times (L_1-1) \times (L_2-1) \times \ldots \times (L_n-1)/(2 \times L_1 \times L_2 \times \ldots \times L_n)$ Here, $\phi$ is called the Euler function, and described in detail in S. Tsujii & M. Kasahara (1990) *Cryptography and Information Security*, published by Shokodo, pp. 11–12.

Therefore, the number of numbers which undergo the Pocklington test to find one prime can be reduced by $(2-1) \times (L_1-1) \times (L_2-1) \times \ldots \times (L_n-1)/(2 \times L_1 \times L_2 \times \ldots \times L_n)$ Since $L_1=3$, $L_2=5$, $L_3=7$, and $n=3$, $$(2-1)\times(3-1)\times(5-1)\times(7-1)/(2\times3\times5\times7) = 48/210 = 8/35$$

This is the same as the related art 1.

Meanwhile, a probability of passing the test of the first primality judging unit 133 is the same as the probability of passing the Rabin-Miller test, that is, ¼ or less. Accordingly, the number of modular exponentiations performed for one composite number is no greater than 1+¼. On the other hand, the number of modular exponentiations performed for one prime number is 2.

Therefore, the number of 512-bit modular exponentiations performed to generate a 512-bit prime from a 256-bit prime is no greater than $$(1+¼) \; ((\ln 2^{512}) \times 8/35 - 1) + 2 = 89.5$$

In the first embodiment, a prime of 512 bits (2×Lenq) is generated from a prime of 256 bits (Lenq) Here, by recursively using the prime generating unit 101, a prime of 512 bits can be obtained from a prime of 16 bits which is easy to find.

Accordingly, when the case of generating a 256-bit prime from a 128-bit prime is considered in the same way, the number of 256-bit modular exponentiations performed to generate a 256-bit prime is no greater than $$(1+¼) \; ((\ln 2^{256}) \times 8/35 - 1) + 2 = 45.1$$

Computational complexity of modular exponentiation depends on the modulus N, and is the order of $N^3$. Therefore, eight 256-bit modular exponentiations can be regarded as being equivalent to one 512-bit modular exponentiation.

When other cases such as generating a 128-bit prime from a 64-bit prime are considered in the same manner, the total computational complexity of the prime generating unit 101 can be measured as the number of 512-bit modular exponentiations. Here, computational complexity of generating a 16-bit or 32-bit prime is much smaller than that of generating a 64-bit, 128-bit, 256-bit, or 512-bit prime and so can be ignored. This being so, when expressed as the number of 512-bit modular exponentiations, the total computational complexity of the prime generating unit 101 is no greater than $$(1+¼)\{((\ln 2^{64})\times 8/35 - 1)/512 + ((\ln 2^{128})\times 8/35 - 1)/64 + ((\ln 2^{256})\times 8/35 - 1)/8 + ((\ln 2^{512})\times 8/35 - 1)\} + 2(1/512 + 1/64 + 1/8 + 1) = 109.0$$

This is smaller than the computational complexity of the related art 1 which is 116.8 or less. Also, unlike the related art 1 a prime can be generated deterministically according to this method.

Furthermore, this method is 2.2 times as fast as the related art 2 which is a conventional deterministic prime generation method.

As described above, the first embodiment exhibits excellent effects of shortening the computational time of deterministic prime generation, when compared with the conventional techniques.

According to the first embodiment, however, prime generation is limited to prime N that satisfies N=1 mod 2
N=1 mod $L_1$
N=1 mod $L_2$
...
N=1 mod $L_n$ This causes a problem of limiting the type of prime which can be generated.

Such a limitation on the type of prime may be undesirable in terms of security, in some cryptographic applications.

The second embodiment below aims to solve this problem.

2. Second Embodiment

The following is a description of a content delivery system 1b (not illustrated) which is another embodiment of the present invention.

The content delivery system 1b has a construction similar to the content delivery system 1. However, the memory card 10 has a prime generating unit 101b in place of the prime generating unit 101. The following description focuses on the differences with the content delivery system 1.

2.1. Generation Controlling Unit 102 in the Memory Card 10

The generation controlling unit 102 outputs prime q, bit size Lenq of prime q, small primes $L_1, L_2, \ldots, L_n$ other than 2, bit size LenL of $(L_1 \times L_2 \times \ldots \times L_n)$, and q mod $L_1$, q mod $L_2, \ldots$, q mod $L_n$, to the prime generating unit 101b. The generation controlling unit 102 then receives prime p from the prime generating unit 101b, and writes prime p to the prime storing unit 103 as prime $p_a$.

Next, the generation controlling unit 102 outputs prime q, bit size Lenq of prime q, small primes $L_1, L_2, \ldots, L_n$ other than 2, bit size LenL of $(L_1 \times L_2 \times \ldots \times L_n)$, and q mod $L_1$, q mod $L_2, \ldots$, q mod $L_n$, to the prime generating unit 101b again. The generation controlling unit 102 then receives prime p from the prime generating unit 101b, and writes prime p to the prime storing unit 103 as prime $p_b$.

2.2. Prime Generating Unit 101b in the Memory Card 10

The prime generating unit 101b generates and outputs prime p whose bit size is twice as large as prime q, when prime q, q mod $L_1$, q mod $L_2, \ldots$, q mod $L_n$ (where $L_1, L_2, \ldots, L_n$ are small primes other than 2), and bit size Lenq of prime q are given.

Here, $L_1, L_2, \ldots, L_n$ and bit size LenL of $(L_1 \times L_2 \times \ldots \times L_n)$ have been given beforehand. For example, $L_1, L_2, \ldots, L_n$ are primes smaller than an expected bit size of input prime q.

Figure 8:
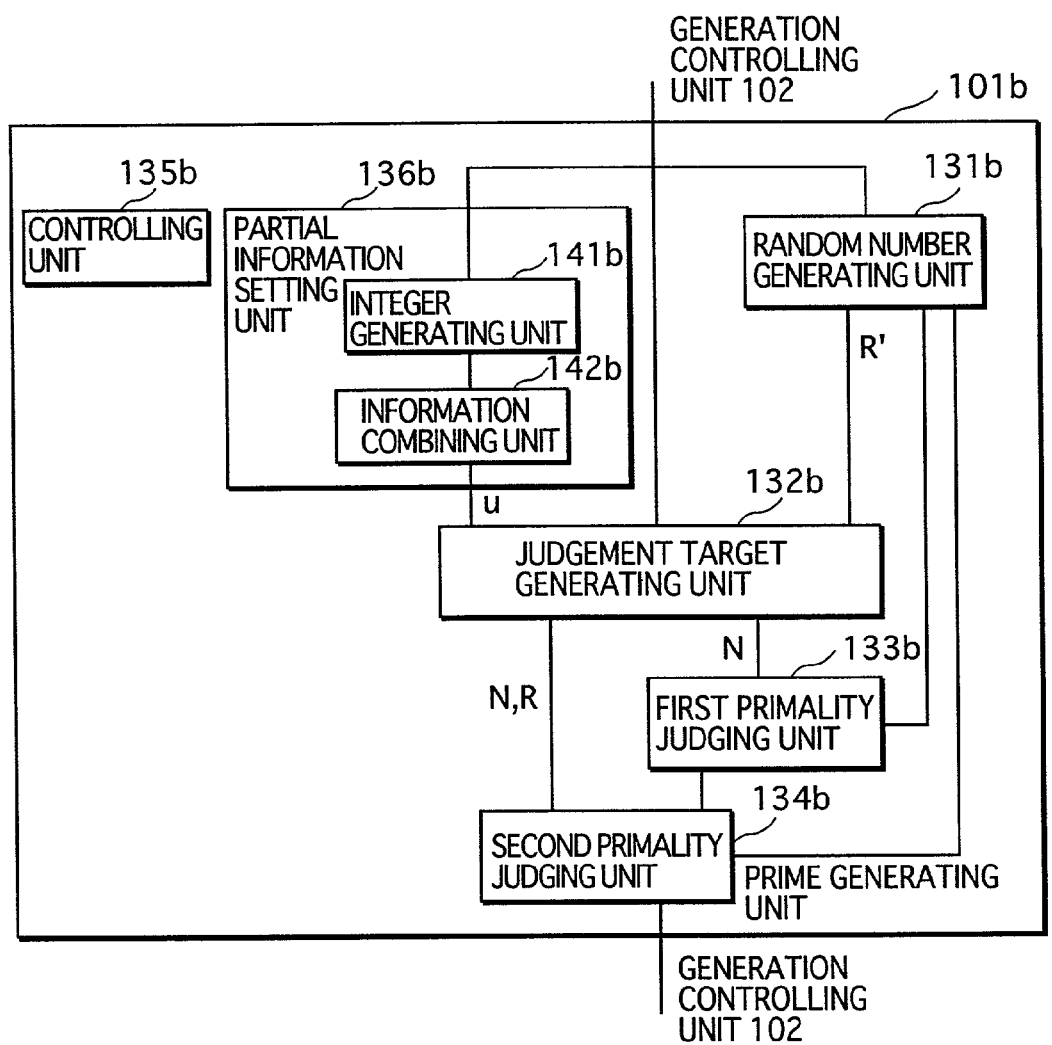
FIG. 8 is a block diagram showing a construction of another prime generating unit.

The prime generating unit 101b includes a partial information setting unit 136b, a random number generating unit 131b, a judgement target generating unit 132b, a first primality judging unit 133b, a second primality judging unit 134b, and a controlling unit 135b, as shown in FIG. 8.

(1) Partial Information Setting Unit 136b

The partial information setting unit 136b receives prime q and q mod $L_1$, q mod $L_2, \ldots$ q mod $L_n$ from the generation controlling unit 102, and calculates number u that satisfies $2 \times u \times q + 1 \neq 0$ mod $L_1$ $2 \times u \times q + 1 \neq 0$ mod $L_2$

...

$2 \times u \times q + 1 \neq 0$ mod $L_n$

The partial information setting unit 136b outputs number u to the judgement target generating unit 132b.

The partial information setting unit 136b is described in greater detail below.

As shown in FIG. 8, the partial information setting unit 136b includes an integer generating unit 141b and an information combining unit 142b.

(Integer Generating Unit 141b)

The integer generating unit 141b generates random numbers $N_1$ ($1 \leq N_1 \leq L_1-1$), $N_2$ ($1 \leq N_2 \leq L_2-1$), ..., $N_n$ ($1 \leq N_n \leq L_n-1$), and calculates $$u_i = (N_i-1)/(2 \times (q \bmod L_i)) \bmod L_i (i=1, 2, \ldots, n)$$

The integer generating unit 141b outputs $u_i$ (i=1, 2, ..., n) to the information combining unit 142b.

(Information Combining Unit 142b)

The information combining unit 142b receives $u_i$ (i=1, 2, ..., n) from the integer generating unit 141b, and finds u mod ($L_1 \times L_2 \times \ldots \times L_n$) that satisfies $$u = u_i \bmod L_i (i=1, 2, \ldots, n)$$

according to the Chinese remainder theorem.

The Chinese remainder theorem is described in detail in E. Okamoto (1993) *An Introduction to Encryption Theory*, published by Kyoritsu, p. 10.

In more detail, the information combining unit 142b computes $$u'_2 = ((L_1)^{-1} \bmod L_2) \times ((u_2 - u_1) \bmod L^2) + u_1 u'_3 = ((L_1 \times L_2)^{-1} \bmod L_3) \times ((u_3 - u'2) \bmod L_3) + u'_2$$

...

$$u'_n = ((L_1 \times L_2 \times \ldots \times L_{n-1})^{-1} \bmod L_n) \times ((u_n - u'_{n-1}) \bmod L_n) + u'_{n-1}$$

The information combining unit 142b then sets $u = u'_n$.

Following this, the information combining unit 142b outputs u to the judgement target generating unit 132b.

(2) Random Number Generating Unit 131b

The random number generating unit 131b receives Lenq and LenL from the generation controlling unit 102, calculates random number R' of (Lenq−LenL−1) bits, and outputs random number R' to the judgement target generating unit 132b.

The random number generating unit 131b also receives third judgement information from the first primality judging unit 133b, and fourth judgement information from the second primality judging unit 134b (the third and fourth judgement information is described in detail later). Upon receiving the third or fourth judgement information, the random number generating unit 131b generates random number R' of (Lenq−LenL−1) bits again, and outputs random number R' to the judgement target generating unit 132b.

(3) Judgement Target Generating Unit 132b

The judgement target generating unit 132b receives prime q and small primes $L_1, L_2, \ldots, L_n$ from the generation controlling unit 102, number u from the partial information setting unit 136b, and random number R' from the random number generating unit 131b.

The judgement target generating unit 132b then generates numbers R and N that satisfy $$R = u + L_1 \times L_2 \times \ldots \times L_n \times R'$$

$$N = 2 \times R \times q + 1$$

The judgement target generating unit 132b outputs numbers R and N to the second primality judging unit 134b, and number N to the first primality judging unit 133b.

(4) First Primality Judging Unit 133b

The first primality judging unit 133b receives number N from the judgement target generating unit 132b, and judges whether the following judgement formula 3 holds true:

$$2^{N-1} = 1 \bmod N \qquad \text{(Judgement Formula 3)}$$

If the judgement formula 3 holds, the first primality judging unit 133b outputs third judgement information indicating that the judgement formula 3 holds, to the second primality judging unit 134b. Otherwise, the first primality judging unit 133b outputs third judgement information indicating that the judgement formula 3 does not hold, to the random number generating unit 131b.

(5) Second Primality Judging Unit 134b

The second primality judging unit 134b receives numbers R and N from the judgement target generating unit 132b. The second primality judging unit 134b also receives the third judgement information indicating that the judgement formula 3 holds, from the first primality judging unit 133b.

Upon receiving the third judgement information, the second primality judging unit 134b judges whether the following judgement formula 4 holds true:

$$2^{2R} \neq 1 \bmod N \qquad \text{(Judgement Formula 4)}$$

If the judgement formula 4 holds, the second primality judging unit 134b outputs number N to the generation controlling unit 102 as prime p.

If the judgement formula 4 does not hold, the second primality judging unit 134b outputs fourth judgement information indicating that the judgement formula 4 does not hold, to the random number generating unit 131b.

(6) Controlling Unit 135b

The controlling unit 135b controls each construction element of the prime generating unit 101b.

2.3. Verification of the Prime Generating Unit 101b

The first and second primality judging units 133b and 134b are respectively the same as the first and second primality judging units 133 and 134. Accordingly, the prime generating unit 101b outputs a prime, in the same way as the prime generating unit 101.

Also, since the bit size of random number R' is (Lenq−LenL−1), the bit size of R is Lenq−1. Hence the bit size of N is 2×Lenq.

2.4. Operation of the Prime Generating Unit 101b

Figure 9:
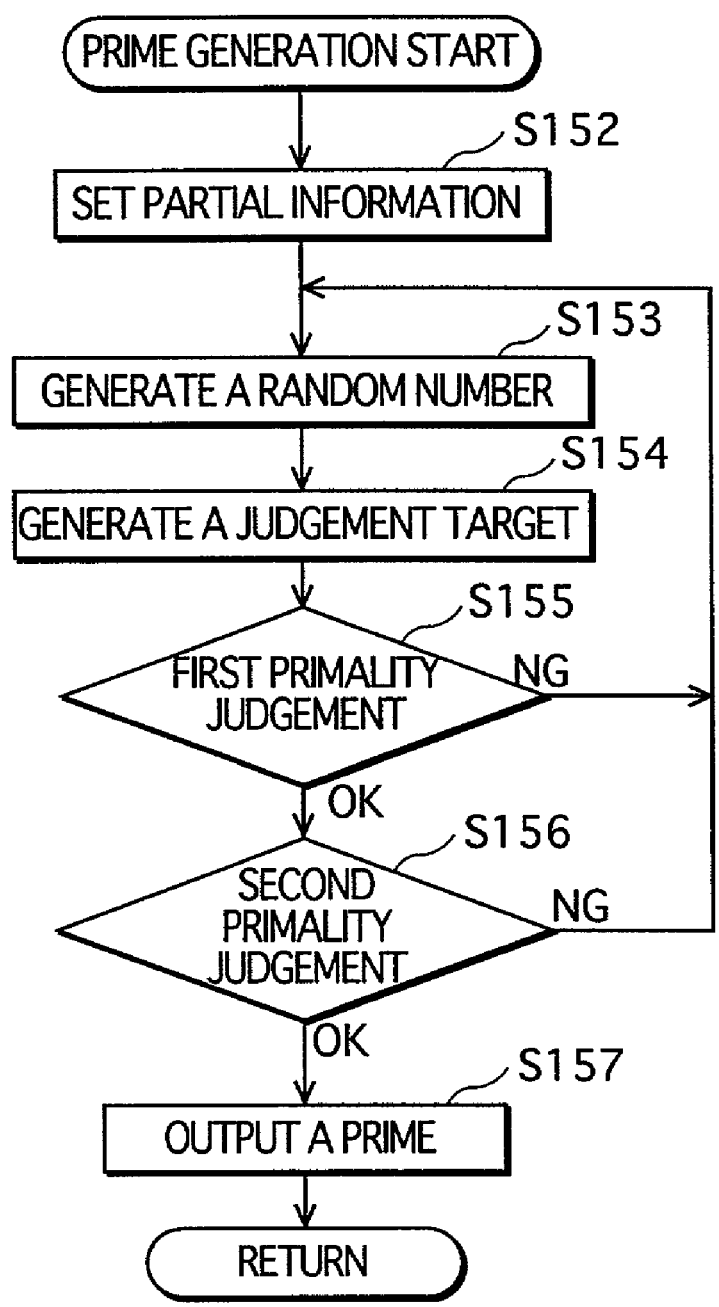
FIG. 9 is a flowchart showing an operation of the prime generating unit shown in FIG. 8.

An operation of the prime generating unit 101b is explained below, with reference to FIG. 9.

The partial information setting unit 136b calculates u such that $2 \times u \times q + \neq 0 \bmod (L_1 \times L_2 \times \ldots \times L_n)$. The partial information setting unit 136b outputs u to the judgement target generating unit 132b (S152). The random number generating unit 131b generates random number R' of (Lenq−LenL−1) bits, and outputs R' to the judgement target generating unit 132b (S153). The judgement target generating unit 132b calculates R and N, outputs N to the first primality judging unit 133b, and outputs N and R to the second primality judging unit 134b (S154). The first primality judging unit 133b judges whether the judgement formula 3 holds. If the judgement formula 3 does not hold (S155:NG), the operation returns to step S153.

If the judgement formula 3 holds (S155:OK), the second primality judging unit 134b judges whether the judgement formula 4 holds. If the judgement formula 4 does not hold (S156:NG), the operation returns to step S153. If the judgement formula 4 holds (S156:OK), the second primality judging unit 134b outputs number N to the generation controlling unit 102 as prime p (S157), thereby completing the operation.

2.4. Evaluation of Computational Complexity and Effects

Computational complexity of the second embodiment is almost the same as that of the first embodiment.

Strictly speaking, the computational complexity of the second embodiment is greater than that of the first embodiment, as it contains the computational complexity of the partial information setting unit 136b. However, the partial information setting unit 136b only performs computations of mod $L_1$, mod $L_2$, . . . , mod $L_n$ and computations of the Chinese remainder theorem, so that its computational complexity is much smaller than computations of 2×Lenq bits. Hence the computational complexity of the partial information setting unit 136b can be regarded as substantially 0.

Therefore, the second embodiment has the same effects as the first embodiment, in terms of computational complexity.

Also, $N=N_1$ mod $L_1$, $N_2$ mod $L_2$, . . . , $N_n$ mod $L_n$ where $N_1, N_2, \ldots, N_n$ are random numbers. In other words, the type of prime generated by the prime generating unit 101b is not limited. This eliminates the security problem associated with the limitation on the type of generated prime.

Thus, the prime generating unit 101b has excellent effects of (1) not limiting the type of prime, (2) generating a prime deterministically, and (3) generating a prime at higher speed than the conventional techniques.

As described above, according to the second embodiment the computational time of deterministic prime generation can be shortened and the type of prime is not limited, when compared with the conventional techniques. This eliminates the security problem associated with the limitation on the type of prime, with it being possible to improve cryptographic security. As a result, a prime generating unit of high practical value that achieves high-speed encryption and signature schemes can be provided.

3. Modification

A cipher communication system (not illustrated) that applies the prime generation explained in the first and second embodiments is described below.

The cipher communication system is roughly made up of a management center device, a user A device, and a user B device. The management center device, the user A device, and the user B device are connected together via a network.

The management center device includes the generation controlling unit 102 and prime generating unit 101 of the first embodiment, through the use of which two primes $p_a$ and $p_b$ are generated. Here, the management center device may instead include the generation controlling unit 102 and prime generating unit 101b of the second embodiment.

Figure 10:
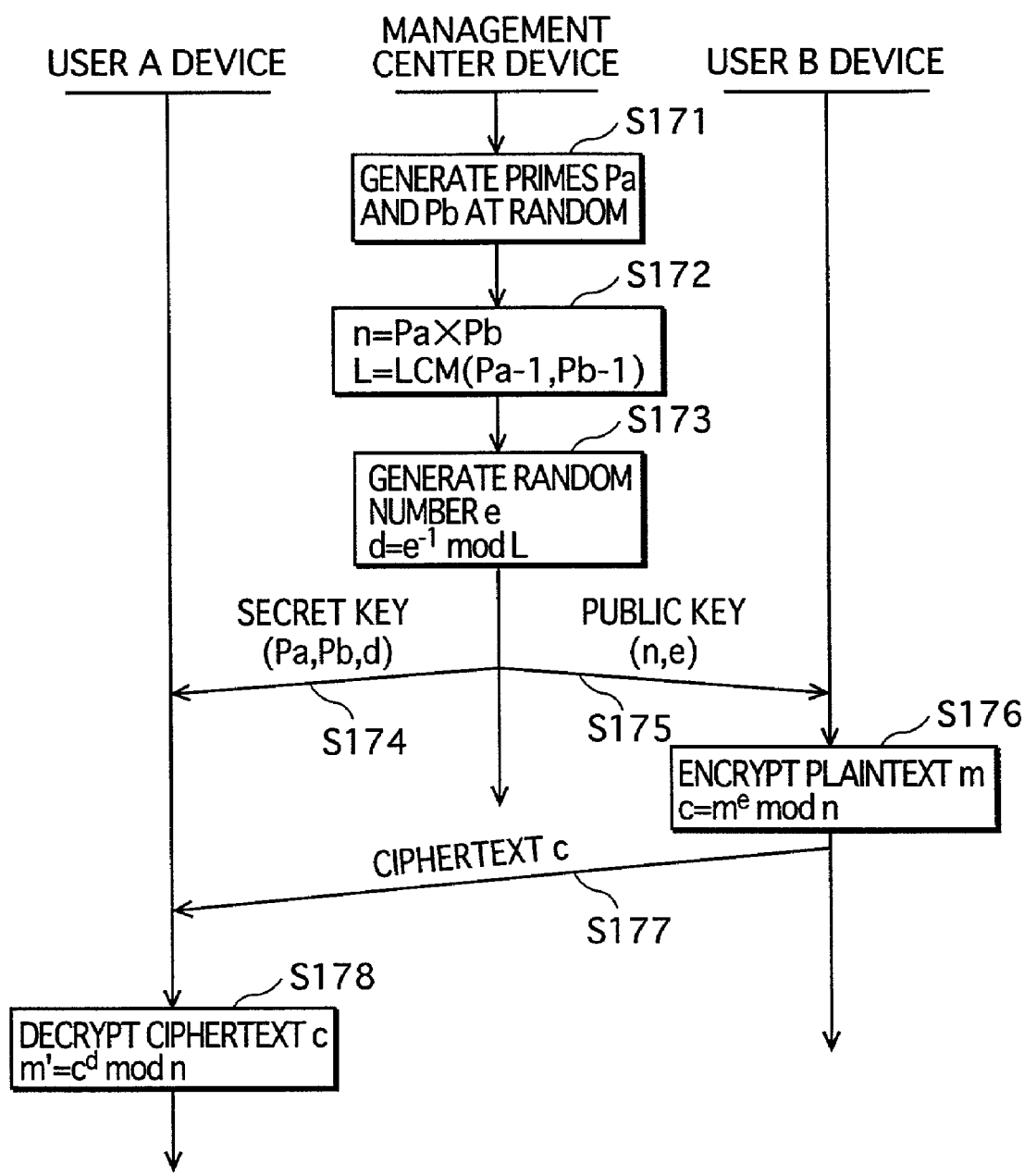
FIG. 10 is a flowchart showing an operation of a cipher communication system.

The following is an explanation of an operation of the cipher communication system, by referring to FIG. 10. This cipher communication system employs the RSA cryptosystem that relies on the computational difficulty of factorization for its security. The RSA cryptosystem is described in detail in T. Okamoto & H. Yamamoto (1997) *Modern Encryption*, published by Sangyo Tosho, pp. 110–113.

(1) Generation of a Public Key by the Management Center Device

The management center device generates primes $P_a$ and $p_b$ at random, using the generation controlling unit 102 and the prime generating unit 101 (S171). The management center device then calculates $n=p_a \times p_b$ and $L=LCM(p_a-1, p_b-1)$ (S172).

Next, the management center device randomly generates random number e ($1 \leq e \leq L-1$, GCD(e,L)=1), and calculates $d=e^{-1}$ mod L (S173). Here, GCD(e,L) is the greatest common divisor of e and L.

After this, the management center device sends primes $p_a$ and $p_b$ and number d to the user A device in secrecy, as a secret key (S174). The management center device also reveals numbers n and e to the user B device, as a public key of the user A device (S175).

(2) Generation of Ciphertext by the User B Device

The user B device calculates $c=m^e$ mod n (S176). Here, m is a message which the user B device is sending to the user A device. The user B device sends ciphertext c to the user A device (S177).

(3) Decryption of the Ciphertext by the User A Device

The user A device calculates $m'=c^d$ mod n to obtain decrypted message m' (S178). Here, $$c^d = (m^e)^d \bmod n$$
$$= m ** (e \times d \bmod L) \bmod n$$
$$= m^1 \bmod n$$
$$= m \bmod n$$

Hence it is clear that decrypted message m' is identical to message m.

In the above operation, the primes are generated in step S171 to obtain the public key.

This prime generation step employs the generation controlling unit and prime generating unit of the first or second embodiment, with it being possible to achieve the effects explained in the first or second embodiment.

4. Conclusion

As described above, when prime q and small primes $L_1, L_2, \ldots, L_n$ ($n \geq 2$) other than 2 which are smaller than q are input, a prime generating unit outputs prime N which is larger than prime q. This prime generating unit generates prime N, such that q satisfies the equation $q=1$ mod $L_i$ (i=1, 2, . . . , n) and N satisfies the equation $N=1$ mod $L_i$ (i=1, 2, . . . , n).

Here, the prime generating unit generates random number R', and generates $R=L_1 \times L_2 \times \ldots \times L_n \times R'$ and $N=2 \times R \times q+1$. The prime generating unit judges the primality of N, using generated numbers R and N.

Also, when prime q and small primes $L_1, L_2, \ldots, L_n$ ($n \geq 2$) other than 2 which are smaller than q are input, a prime generating unit outputs prime N which is larger than prime q. This prime generating unit outputs u that satisfies $2 \times u \times q+1 \neq 0$ mod $L_i$ (i=1, 2, . . . , n). The prime generating unit then generates random number R', and generates $R=u+L_1 \times L_2 \times \ldots \times L_n \times R'$ and $N=2 \times R \times q+1$. The prime generating unit judges the primality of N, using generated numbers R and N.

Here, the prime generating unit generates integers $N_1$ ($1 \leq N_1 \leq L_1-1$), $N_2$ ($1 \leq N_2 \leq L_2-1$), . . . , $N_n$ ($1 \leq N_n \leq L_n-1$), and calculates $u_i=(N_i-1)/(2 \times (q \bmod L_i))$ mod $L_i$ (i=1, 2, . . . , n). The prime generating unit then finds u that satisfies $u=u_i$ mod $L_i$ (i=1, 2, . . . , n), using $u_i$ (i=1, 2, . . . , n).

To judge the primality of N, it is judged whether $2^{N-1}=1$ mod N and $2^{2R} \neq 1$ mod N hold true.

According to the present invention, not only a prime can be generated definitely, but also computational time can be shortened when compared with the conventional techniques. Moreover, by removing the limitation on the type of generated prime, the security problem associated with such a limitation on the type of prime can be solved, with it being possible to improve security.

Hence an information security device and prime generation device of high practical value that achieve high-speed encryption and signature schemes can be provided.

5. Other Modifications

The present invention has been described by way of the above embodiments, though it should be obvious that the invention is not limited to the above. Example modifications are given below.

(1) The prime generating unit of each of the above embodiments may receive an input of integer Len and output a prime of Len bits.

(2) The prime generating unit of each of the above embodiments may be provided as an independent device.

(3) The present invention may be a prime application device that is equipped with the prime generating unit of the first or second embodiment. Specific examples of the prime application device include a cipher communication system made up of an encryption device and a decryption device, and a digital signature system made up of a digital signature device and a digital signature verification device. These systems are information security systems that handle information securely and reliably.

(4) The first primality judging unit 133, the second primality judging unit 134, the first primality judging unit 133*b*, and the second primality judging unit 134*b* may use judgement formulas different with those described in the above embodiments.

As one example, the first primality judging unit 133 and the first primality judging unit 133*b* may use the following judgement formula:

$$a^{N-1} = 1 \bmod N$$

where a is an integer such that $1 \leq a \leq N-1$.

Also, the second primality judging unit 134 and the second primality judging unit 134*b* may use the following judgement formula:

$$b^{2R} \neq 1 \bmod N$$

or $$GCD(b^{2R}-1, N) = 1$$

where b is an integer such that $1 \leq b \leq N-1$.

(5) The above embodiments describe the case where the digital work is music, but other types of digital works are applicable too. Specific examples include voice, moving image, still image, text, tabulated data, and digital information of a computer program.

(6) The above embodiments describe the case where a prime generating unit is used in a security system that employs the RSA cryptosystem, but the use of the prime generating unit is not limited to such. For example, the prime generating unit may be used in elliptic curve cryptosystems. The elliptic curve cryptosystems generate and utilize one prime.

(7) The present invention also applies to the methods described above. These methods may be realized by computer programs that are executed by computers. Such computer programs may be distributed as digital signals.

Also, the present invention may be realized by a computer-readable recording medium, such as a flexible disk, a hard disk, a CD-ROM (Compact Disk-Read Only Memory), an MO (Magneto-Optical) disk, a DVD (Digital Versatile Disk), a DVD-ROM, a DVD-RAM, or a semiconductor memory, on which computer programs and/or digital signals mentioned above are recorded. Conversely, the present invention may also be realized by a computer program and/or digital signal that is recorded on a recording medium.

Computer programs or digital signals that achieve the present invention may also be transmitted via a network, such as an electronic communications network, a wired or wireless communications network, or the Internet.

The present invention can also be realized by a computer system that includes a microprocessor and a memory. In this case, a computer program can be stored in the memory, with the microprocessor operating in accordance with this computer program.

The computer programs and/or digital signals may be provided to an independent computer system by distributing a recording medium on which the computer programs and/or digital signals are recorded, or by transmitting the computer programs and/or digital signals via a network.

(8) The limitations described in the embodiments and the modifications may be freely combined.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An information security device that handles predetermined information securely and reliably based on an intractability of factorization, by generating two primes and using a multiplication of the two primes, said device comprising:

an acquiring unit operable to acquire a known prime q and n number of known primes $L_1, L_2, \ldots, L_n$, where $L_1, L_2, \ldots, L_n$ are primes, other than 2, that are smaller than the prime q, and the prime q satisfies $q = 1 \bmod L_i$ ($i = 1, 2, \ldots, n$);

a generating unit operable to generate a number N whose bit length is twice as large as a bit length of the prime q, where numbers that relate to any of the primes $L_1, L_2, \ldots, L_n$ are excluded from the generation of the number N; and a judging unit operable to judge primality of the number N, and output the number N as a prime if the number N is judged as being prime, wherein the generating unit is operable to generate the number N that satisfies $N = 1 \bmod L_i$ ($i = 1, 2, \ldots, n$), and wherein the generating unit includes:

a random number generating unit operable to generate a random number R' whose bit length is (Lenq−LenL−1), where Lenq is the bit length of the prime q and LenL is a bit length of $(L_1 \times L_2 \times \ldots \times L_n)$; and a judgement target generating unit operable to (a) generate a number R $$R = L_1 \times L_2 \times \ldots \times L_n \times R'$$

using the random number R' and the primes $L_1, L_2, \ldots, L_n$, and (b) generate the number N $$N = 2 \times R \times q + 1$$

using the prime q and the number R, and wherein the judging unit judges the primality of the number N, using the number N and the number R generated by the judgement target generating unit.

2. The information security device of claim 1, wherein the judging unit (a) judges, for the number N, whether a first judgement formula $$2^{N-1} = 1 \bmod N$$

holds true, (b) further judges, for the number N and the number R, whether a second judgement formula $$2^{2R} \neq 1 \bmod N$$

holds true, and (c) judges the number N as being prime if both of the first judgement formula and the second judgement formula hold true.

3. An information security device that handles predetermined information securely and reliably based on an intractability of factorization, by generating two primes and using a multiplication of the two primes, said device comprising:

an acquiring unit operable to acquire a known prime q and n number of known primes $L_1, L_2, \ldots, L_n$, where $L_1, L_2, \ldots, L_n$ are primes, other than 2, that are smaller than the prime q, and the prime q satisfies $q=1 \bmod L_i$ (i=1, 2, ..., n);

a generating unit operable to generate a number N whose bit length is twice as large as a bit length of the prime q, where numbers that relate to any of the primes $L_1, L_2, \ldots, L_n$ are excluded from the generation of the number N; and a judging unit operable to judge primality of the number N, and output the number N as a prime if the number N is judged as being prime, wherein the generating unit includes:

a partial information generating unit operable to generate a number u that satisfies $$2 \times u \times q1 \neq 0 \bmod L_i (i=1, 2, \ldots, n)$$

using the prime q;

a random number generating unit operable to generate a random number R'; and a judgement target generating unit operable to (a) generate a number R $$R = u + L_1 \times L_2 \times \ldots \times L_n \times R'$$

using the primes $L_1, L_2, \ldots, L_n$ the number u, and the random number R', and (b) generate the number N $$N = 2 \times R \times R \times q + 1$$

using the prime q and the number R, and wherein the judging unit judges the primality of the number N, using the number N and the number R generated by the judgement target generating unit.

4. The information security device of claim 3, wherein the partial information generating unit includes:

an integer generating unit operable to (a) generate integers $N_1$ ($1 \leq N_1 \leq L_1-1$), $N_2$ ($1 \leq N_2 \leq L_2-1$), ..., $N_n$ ($1 \leq N_n \leq L_n-1$), and (b) calculate a number $u_i$ that satisfies $$u_i = (N_i - 1)/(2 \times (q \bmod L_i)) \bmod L_i (i=1, 2, \ldots, n);$$
and an information combining unit operable to calculate the number u that satisfies $$u = u_i \bmod L_i (i=1, 2, \ldots, n)$$

using the number $u_i$ (i=1, 2, ..., n) calculated by the integer generating unit.

5. The information security device of claim 4, wherein the judging unit (a) judges, for the number N, whether a first judgement formula $$2^{N-1} = 1 \bmod N$$

holds true, (b) further judges, for the number N and the number R, whether a second judgement formula $$2^{2R} \neq 1 \bmod N$$

holds true, and (c) judges the number N as being prime if both of the first judgement formula and the second judgement formula hold true.

6. An IC card that handles predetermined information securely and reliably based on an intractability of factorization, by generating two primes and using a multiplication of the two primes, said IC card comprising:

an acquiring unit operable to acquire a known prime q and n number of known primes $L_1, L_2, \ldots, L_n$, where $L_1, L_2, \ldots, L_n$ are primes, other than 2, that are smaller than the prime q, and the prime q satisfies $q=1 \bmod L_i$ (i=1, 2, ..., n);

a generating unit operable to generate a number N whose bit length is twice as large as a bit length of the prime q, where numbers that relate to any of the primes $L_1, L_2, \ldots, L_n$ are excluded from the generation of the number N; and a judging unit operable to judge primality of the number N, and output the number N as a prime if the number N is judged as being prime, wherein the generating unit is operable to generate the number N that satisfies $N=1 \bmod L_i$ (i=1, 2, ..., n), wherein the generating unit includes:

a random number generating unit operable to generate a random number R' whose bit length is (Lenq−LenL−1), where Lenq is the bit length of the prime q and LenL is a bit length of ($L_1 \times L_2 \times \ldots \times L_n$); and a judgement target generating unit operable to (a) generate a number R $$R = L_1 \times L_2 \times \ldots \times L_n \times R'$$

using the random number R' and the primes $L_1, L_2, \ldots, L_n$, and (b) generate the number N $$N2 \times R \times q + 1$$

using the prime q and the number R, and wherein the judging unit judges the primality of the number N, using the number N and the number R generated by the judgement target generating unit.

7. A prime number generation device for generating a prime, said device comprising:

an acquiring unit operable to acquire a known prime q and n number of known primes $L_1, L_2, \ldots, L_n$, where $L_1, L_2, \ldots, Ln$ are primes, other than 2, that are smaller than the prime q, and the prime q satisfies $q=1 \bmod Li$ (i=1, 2, ..., n);

a generating unit operable to generate a number N whose bit length is twice as large as a bit length of the prime q, where numbers that relate to any of the primes $L_1, L_2, \ldots, L_n$ are excluded from the generation of the number N; and a judging unit operable to judge primality of the number N, and output the number N as a prime if the number N is judged as being prime, wherein the generating unit is operable to generate the number N that satisfies $N=1 \bmod L_i$(i=1, 2, ..., n), wherein the generating unit includes:

a random number generating unit operable to generate a random number R' whose bit length is (Lenq−LenL−1), where Lenq is the bit length of the prime q and LenL is a bit length of ($L_1 \times L_2 \times \ldots \times L_n$); and a judgement target generating unit operable to (a) generate a number R $$R = L_1 \times L_2 \times \ldots \times L_n \times R'$$

using the random number R' the primes $L_1, L_2, \ldots, L_n$ and (b) generate the number N $$N=2 \times R \times q+1$$

using the prime q and the number R, and wherein the judging unit judges the primality of the number N, using the number N and the number R generated by the judgement target generating unit.

8. A prime number generation method used in a prime number generation device for generating a prime, said method comprising:
acquiring a known prime q and n number of known primes $L_1, L_2, \ldots, L_n$ where $L_1, L_2, \ldots, L_n$ are primes, other than 2, that are smaller than the prime q, and the prime q satisfies q=1 mod $L_i$ (i=1, 2, . . . , n);
generating a number N whose bit length is twice as large as a bit length of the prime q, where numbers that relate to any of the primes $L_1, L_2, \ldots, L_n$ are excluded from the generation of the number N; and
judging primality of the number N, and outputting the number N as a prime if the number N is judged as being prime,
wherein said step of generating comprises:
generating the number N that satisfies N=1 mod Li (i=1, 2, . . . , n);
generating a random number R' whose bit length is (Lenq−LenL−1), where Lenq is the bit length of the prime q and LenL is a bit length of ($L_1 \times L_2 \times \ldots \times L_n$); and
generating a number R, where $R=L_1 \times L_2 \times \ldots \times L_n \times R'$, using the random number R' and the primes $L_1, L_2, \ldots, L_n$, and generating the number N, where $N=2 \times R \times q+1$, using the prime q and the number R, and
wherein said step of judging comprises judging the primality of the number N, using the number N and the number R generated in said step of generating.

9. A prime number generation program embodied on a computer-readable medium, and used in a computer for generating a prime, said program causing the computer to execute a method comprising:
acquiring a known prime q and n number of known primes $L_1, L_2, \ldots, L_n$, where $L_1, L_2, \ldots, L_n$ are primes, other than 2, that are smaller than the prime q, and the prime q satisfies q=1 mod $L_i$ (i=1, 2, . . . , n);
generating a number N whose bit length is twice as large as a bit length of the prime q, where numbers that relate to any of the primes $L_1, L_2, \ldots, L_n$ are excluded from the generation of the number N; and
judging primality of the number N, and outputting the number N as a prime if the number N is judged as being prime,
wherein said step of generating comprises:
generating the number N that satisfies N=1 mod $L_i$ (i=1, 2, . . . , n);
generating a random number R' whose bit length is (Lenq−LenL−1), where Lenq is the bit length of the prime q and LenL is a bit length of ($L_1 \times L_2 \times \ldots \times L_n$); and
generating a number R, where $R=L_1 \times L_2 \times \ldots \times L_n \times R'$, using the random number R' and the primes $L_1, L_2, \ldots, L_n$, and generating the number N, where $N=2 \times R \times q+1$, using the prime q and the number R, and
wherein said step of judging comprises judging the primality of the number N, using the number N and the number R generated in said step of generating.

10. An IC card that handles predetermined information securely and reliably based on an intractability of factorization, by generating two primes and using a multiplication of the two primes, said IC card comprising:
an acquiring unit operable to acquire a known prime q and n number of known primes $L_1, L_2, \ldots, L_n$, where $L_1, L_2, \ldots, L_n$ are primes, other than 2, that are smaller than the prime q, and the prime q satisfies q=1 mod $L_i$ (i=1, 2, . . . , n);
a generating unit operable to generate a number N whose bit length is twice as large as a bit length of the prime q, where numbers that relate to any of the primes $L_1, L_2, \ldots, L_n$ are excluded from the generation of the number N; and
a judging unit operable to judge primality of the number N, and output the number N as a prime if the number N is judged as being prime,
wherein the generating unit includes:
a partial information generating unit operable to generate a number u that satisfies $$2 \times u \times q+1 \not\equiv 0 \bmod L_i \ (i=1, 2, \ldots, n)$$

using the prime q;
a random number generating unit operable to generate a random number R'; and
a judgement target generating unit operable to (a) generate a number R $$R=u+L_1 \times L_2 \times \ldots \times L_n \times R'$$

using the primes $L_1, L_2, \ldots, L_n$, the number u, and the random number R', and (b) generate the number N $$N=2 \times R \times q+1$$

using the prime q and the number R, and
wherein the judging unit judges the primality of the number N, using the number N and the number R generated by the judgement target generating unit.

11. A prime number generation device for generating a prime, said device comprising:
an acquiring unit operable to acquire a known prime q and n number of known primes $L_1, L_2, \ldots, L_n$, where $L_1, L_2, \ldots, L_n$ are primes, other than 2, that are smaller than the prime q, and the prime q satisfies q=1 mod $L_i$ (i=1, 2, . . . , n);
a generating unit operable to generate a number N whose bit length is twice as large as a bit length of the prime q, where numbers that relate to any of the primes $L_1, L_2, \ldots, L_n$ are excluded from the generation of the number N; and
a judging unit operable to judge primality of the number N, and output the number N as a prime if the number N is judged as being prime,
wherein the generating unit includes:
a partial information generating unit operable to generate a number u that satisfies $$2 \times u \times q+1 \not\equiv 0 \bmod L_i \ (i=1, 2, \ldots, n)$$

using the prime q;
a random number generating unit operable to generate a random number R'; and
a judgement target generating unit operable to (a) generate a number R $$R=u+L_1 \times L_2 \times \ldots \times L_n \times R'$$

using the primes $L_1, L_2, \ldots, L_n$, the number u, and the random number R', and (b) generate the number N $$N=2\times R\times q+1$$

using the prime q and the number R, and wherein the judging unit judges the primality of the number N, using the number N and the number R generated by the judgement target generating unit.

12. A prime number generation method used in a prime number generation device for generating a prime, said method comprising:

acquiring a known prime q and n number of known primes $L_1, L_2, \ldots, L_n$, where $L_1, L_2, \ldots, L_n$ are primes, other than 2, that are smaller than the prime q, and the prime q satisfies $q=1 \bmod L_i$ ($i=1, 2, \ldots, n$);

generating a number N whose bit length is twice as large as a bit length of the prime q, where numbers that relate to any of the primes $L_1, L_2, \ldots, Ln$ are excluded from the generation of the number N; and judging primality of the number N, and outputting the number N as a prime if the number N is judged as being prime, wherein said step of generating comprises:

generating a number u that satisfies $2\times u\times q+1 \neq 0 \bmod L_i$ ($i=1, 2, \ldots, n$), using the prime q;

generating a random number R'; and generating a number R, where $R=u+L_1\times L_2\times \ldots \times L_n\times R'$, using the primes $L_1, L_2, \ldots, L_n$, the number u, and the random number R', and generating the number N, where $N=2\times R\times q+1$, using the prime q and the number R, and wherein said step of judging comprises judging the primality of the number N, using the number N and the number R generated in said generating step.

13. A prime number generation program embodied on a computer-readable medium, and used in a computer for generating a prime, said program causing the computer to execute a method comprising:

acquiring a known prime q and n number of known primes $L_1, L_2, \ldots, L_n$, where $L_1, L_2, \ldots, L_n$ are primes, other than 2, that are smaller than the prime q, and the prime q satisfies $q=1 \bmod L_i$ ($i=1, 2, \ldots, n$);

generating a number N whose bit length is twice as large as a bit length of the prime q, where numbers that relate to any of the primes $L_1, L_2, \ldots, L_n$ are excluded from the generation of the number N; and judging primality of the number N, and outputting the number N as a prime if the number N is judged as being prime, wherein said step of generating comprises:

generating a number u that satisfies $2\times u\times q+1 \neq 0 \bmod L_i$ ($i=1, 2, \ldots, n$), using the prime q;

generating a random number R'; and generating a number R, where $R=u+L_1\times L_2\times \ldots \times L_n\times R'$, using the primes $L_1, L_2, \ldots, L_n$, the number u, and the random number R', and generating the number N, where $N=2\times R\times q+1$, using the prime q and the number R, and wherein said step of judging comprises judging the primality of the number N, using the number N and the number R generated in said generating step.

* * * * *

UNITED STATES PATENT AND TRADEMARK OFFICE
CERTIFICATE OF CORRECTION

PATENT NO.       : 7,130,422 B2                                          Page 1 of 1
APPLICATION NO.  : 10/120489
DATED            : October 31, 2006
INVENTOR(S)      : Yuichi Futa et al.

It is certified that error appears in the above-identified patent and that said Letters Patent is hereby corrected as shown below:

Column 23,

Line 27, "$2 \times u \times q1 \neq 0$" should read -- $2 \times u \times q + 1 \neq 0$ --.

Line 34, "$L_n$ the number u," should read --$L_n$, the number u,--.

Line 36, "$N = 2 \times R \times R \times q + 1$" should read -- $N = 2 \times R \times q + 1$ --.

Column 24,

Line 33, "$N 2 \times R \times q + 1$" should read -- $N = 2 \times R \times q + 1$ --.

Column 26,

Line 21, "$2 \times u \times q + + 1 \neq 0$" should read -- $2 \times u \times q + 1 \neq 0$ --.

Signed and Sealed this

Twenty-third Day of October, 2007

JON W. DUDAS
*Director of the United States Patent and Trademark Office*